(12) United States Patent
Wetzig

(10) Patent No.: US 12,333,033 B2
(45) Date of Patent: Jun. 17, 2025

(54) SYSTEM AND METHOD FOR DIGITAL SIGNATURE FOR ELECTRONIC TEXT DOCUMENT SECURITY

(71) Applicant: Nicholas James Wetzig, Georgetown, TX (US)

(72) Inventor: Nicholas James Wetzig, Georgetown, TX (US)

(73) Assignee: Nicholas James Wetzig, Georgetown, TX (US)

( * ) Notice: Subject to any disclaimer, the term of this patent is extended or adjusted under 35 U.S.C. 154(b) by 0 days.

(21) Appl. No.: 18/773,081

(22) Filed: Jul. 15, 2024

(65) Prior Publication Data

US 2025/0021677 A1   Jan. 16, 2025

Related U.S. Application Data

(60) Provisional application No. 63/513,499, filed on Jul. 13, 2023.

(51) Int. Cl.
   *G06F 21/62*   (2013.01)
   *G06F 21/00*   (2013.01)
   *G06F 21/60*   (2013.01)

(52) U.S. Cl.
   CPC ........ *G06F 21/6209* (2013.01); *G06F 21/604* (2013.01)

(58) Field of Classification Search
   CPC ............... G06F 21/6209; G06F 21/604; G06F 21/6218; G06F 21/6227; G06F 21/6272; G06F 21/64; G06F 21/645
   See application file for complete search history.

(56) References Cited

U.S. PATENT DOCUMENTS

| | | | |
|---|---|---|---|
| 2008/0163364 A1* | 7/2008 | Ferlitsch | G06F 16/93 707/999.102 |
| 2011/0128566 A1* | 6/2011 | Eum | H04N 1/00872 358/1.14 |

* cited by examiner

*Primary Examiner* — Edward Zee
(74) *Attorney, Agent, or Firm* — Pillsbury Winthrop Shaw Pittman, LLP

(57) ABSTRACT

A process includes receiving instruction to provide an electronic text document to a plurality of users and a security instruction. In response to the security instruction, the process generates a respective copy of the electronic text document for each user. Each respective copy of the electronic text document is associated with a user identifier of that user and each respective copy includes a respective unique identifier based on a change in presentation of at least one of at least one character of text or at least one image included in the electronic text document. Each copy of the electronic text document having a unique identifier is provided to the user associated with the user identifier associated with that respective copy of the electronic text document. A mapping of each user identifier to the respective unique identifier for the respective copy of the electronic text document is stored in storage.

19 Claims, 17 Drawing Sheets

Partial leaked email. Black arrows are for layer one, and white signatures are for layer two:

Layer 1 - Sig Pos 1 ⬇

I am writing to inform you about the next iPhone release that we are working on at Apple. As you know, we are always pushing the boundaries of technology and innovation, and this new iPhone is no exception.

As the CEO of Apple, I want to remind all employees that this information is strictly confidential and should not be shared with anyone outside of the company. We are counting on your discretion and commitment to keeping this information safe and secure! ⇧ Layer 2 - Sig Pos 6

Layer 1 - Sig Pos 2 ⬆        Layer 1 - Sig Pos 3 ⬇

The new iPhone will feature a cutting-edge camera system, with improved digital zoom, improved low-light Layer 2 - Sig Pos 5 ⇧ performance, and advanced image processing capabilities. It will also include a larger, more vibrant display, and a new chip that will bring even more speed and power to the device!

Layer 2 - Sig Pos 4 ⇧        ⇧

Layer 1 - Black

| Signature Position | Identifier | Visible Signatures From Leak |
|---|---|---|
| 1 | 1 | ✓ |
| 2 | 1 | ✓ |
| 3 | with improved digital zoom, improved low-light performance | ✓ |
| 4 | Double space | X |
| 5 | . | X |
| 6 | 1 | X |

Here we have the 1st layer (Black) starting from top to bottom. Don't even bother paying attention to the 4-6 signature positions, in the real scenario, you won't have them. Only pay attention to 1-3 as this is what you have, since the leaker only leaked the first half of the email. If you look at the "Visible Signatures From Leak" column, you can see what signatures we have access to from this partial leak in this scenario. The Checkmark icon is what we have and the X icon is what we do NOT have in this scenario.

Layer 2 - White

| Signature Position | Identifier | Visible Signatures From Leak |
|---|---|---|
| 1 | approved by your manager, it is a party with a clearance, is a trusted Apple parts manufacturer, or is a trusted Apple supplier | X |
| 2 | Double space | X |
| 3 | Double space | X |
| 4 | Speed and power | ✓ |
| 5 | Double space | ✓ |
| 6 | Double space | ✓ |

Here we have the 2nd layer (white) starting from bottom to top. Don't even bother paying attention to the 1-3 signature positions, in the real scenario, you won't have them. Only pay attention to 4-6 as this is what you have, since the leaker only leaked the first half of the email. If you look at the "Visible Signatures From Leak" column, you can see what signatures we have access to from this partial leak in this scenario. The Checkmark icon is what we have and the X icon is what we do NOT have in this scenario.

Combined table: Black is layer 1 and white is layer 2.

| Signature Position | Identifier | Visible Signatures From Leak |
|---|---|---|
| 1 | 1 | ✓ |
| 2 | 1 | ✓ |
| 3 | with improved digital zoom, improved low-light performance | ✓ |
| 4 | Speed and power | ✓ |
| 5 | Double space | ✓ |
| 6 | Double space | ✓ |

Now that we have these identifiers from two different signature layers, we can build a fully functional signature identifier by combining the visible signatures from the two separate layers together. From this information, we would be able to deduce who the leaker is. We would be able to get our recipient ID and figure out the source of the leak.

FIG. 10

SYSTEM AND METHOD FOR DIGITAL SIGNATURE FOR ELECTRONIC TEXT DOCUMENT SECURITY

CROSS-REFERENCE TO RELATED APPLICATIONS

This patent application claims the benefit of U.S. Provisional Patent Application 63/513,499, titled "Plain-Text Digital Signatures for Email Security," filed 13 Jul. 2023. The entire content of each aforementioned patent filing is hereby incorporated by reference.

BACKGROUND

1. Field

This disclosure relates to systems and methods for improving security of electronic text documents.

2. Description of the Related Art

Companies, organizations, and governments are all experiencing data leaks on a massive scale in current times. Many insiders at these companies are leaking information to the press, competition, social media, or other avenues. The effects are often negative, impacting stock price, innovation, confidentiality, and much more. Governments are also experiencing massive amounts of data leaks. One common way that information leaks is through the capture of screen shots by individuals with access to the information. For example, an individual may take a screen shot of an email that is meant for internal use and publicize the screen shot. This could happen due to confusion about whether the employee is allowed to distribute what is provided in the email or out of malice. In either case, a company or government agency may want to track the leak.

SUMMARY

The following is a non-exhaustive listing of some aspects of the present techniques. These and other aspects are described in the following disclosure.

Some aspects include a process including: receiving, by one or more processors, instruction to provide an electronic text document to a plurality of users, wherein the instruction includes a security instruction; in response to the security instruction, generating, by one or more processors, a respective copy of the electronic text document for each user of the plurality of users, wherein each respective copy of the electronic text document is associated with a user identifier of that user and each respective copy includes a respective unique identifier based on a change in presentation of at least one of at least one character of text or at least one image included in the electronic text document; providing, by one or more processors, each respective copy of the electronic text document that includes the respective unique identifier to the user associated with the user identifier associated with that respective copy of the electronic text document; and storing, by one or more processors, a mapping of each user identifier to the respective unique identifier for the respective copy of the electronic text document in a storage system.

Some aspects include a tangible, non-transitory, machine-readable medium storing instructions that when executed by a data processing apparatus cause the data processing apparatus to perform operations including the above-mentioned process.

Some aspects include system, including: one or more processors; and memory storing instructions that when executed by the processors cause the processors to effectuate operations of the above-mentioned process.

BRIEF DESCRIPTION OF THE DRAWINGS

FIG. 10 illustrates an example leak with multiple layers of unique identifiers, in accordance with some embodiments of the present disclosure.

Figure 1:
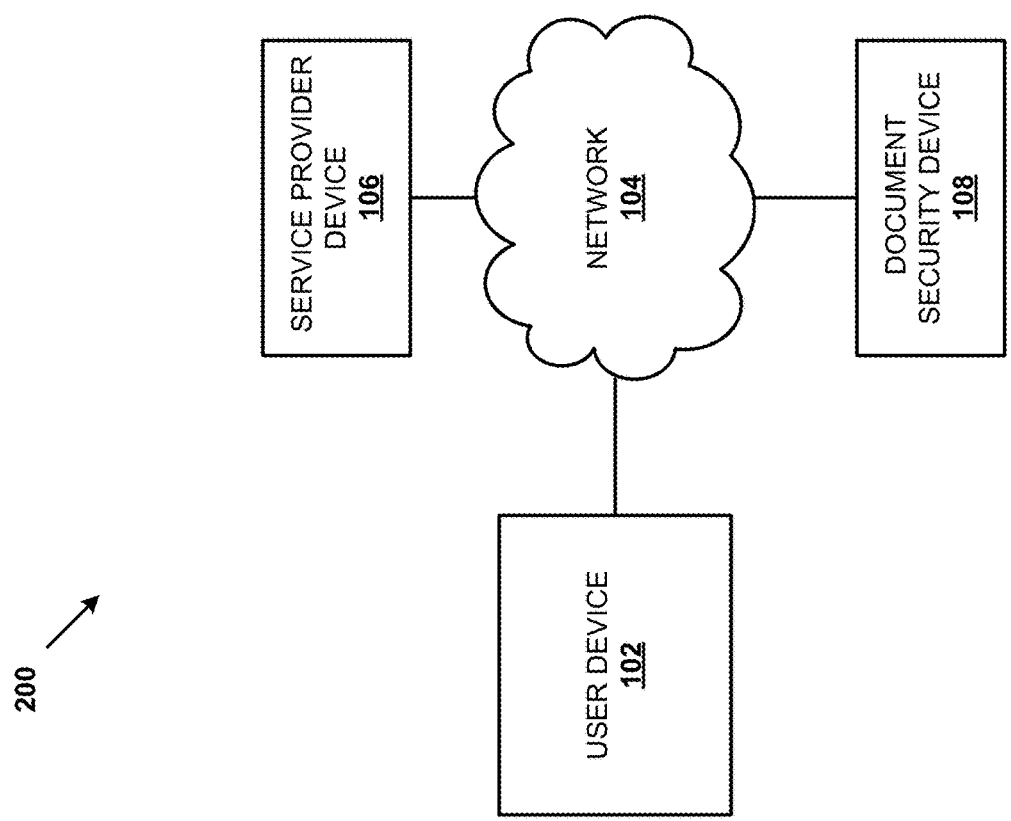
FIG. 1 is a block diagram illustrating a document security system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of document tracking, security, and production as well as electronic mail and electronic document storage. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As discussed above, leaking of confidential information or internal communications can be detrimental to various organizations. While security is an issue, companies may also want to track dissemination of information for other business purposes. Embodiments of the present disclosure provide for a document security system that allows a user to embed a unique hidden identifier into a document to track how the document is distributed or if another user caused a document to leak. For a document that a user produces, the system can determine signature positions in the document where a characteristic of the document is changeable without altering the main message or content of the document. The number of signature positions may be based on the number of ultimate user recipients that are to obtain the document and also the number of changes that a signature position can undergo. The system may create a plurality of copies of the document each having their own unique identifier created by the combination of the signature positions with their respective characteristic. Each copy's unique identifier may be mapped to a user identifier of the user obtaining the copy. The system can then provide those copies of the document to the intended recipients.

If the user that created the document and its unique "copies" obtains a copy, then the user can determine the document from which that copy derived. Once the document is obtained, the user can obtain a signature position key or in some instances signature position keys for the document. The signature position key may be used to locate the signature positions in the obtained copy to determine the unique identifier. Based on the unique identifier or layers of multiple unique identifiers, the system may be able to determine the user that originally obtained the copy by matching the unique identifier to a unique identifier in the mappings of the unique identifiers and the user identifiers.

Referring now to FIG. 1, an embodiment of a document security system 100 is illustrated. In an embodiment, the document security system 100 may include one or more user devices (e.g., a user device 102 illustrated in FIG. 1) coupled to a network 104. Furthermore, the document security system 100 may include one or more service provider devices (e.g., a service provider device 106 illustrated in FIG. 1) coupled to the network 104. Further still, the document security system 100 may include a document security device 108 coupled to the network 104. In a specific example, the service provider device 106 may belong to a document storage provider, an electronic mail service provider, a social media service provider, or another service provider that would be apparent to one of skill in the art in possession of the present disclosure. As described herein, the service provider device 106 may be configured to perform a service via an application on the user device 102.

While using a service provided by the service provider device 106, a user of a user device 102 may generate a document that is to be seen or distributed to a plurality of other users of the user devices 102. The document may include an electronic mail, a word processing document, a spreadsheet, a slide presentation, a social media post, or other text-based document that would be apparent to one of skill in the art in possession of the present disclosure. The document may include sensitive information, or the user may want to track its usage and further distribution. As such, the user may want to track the document without the recipient knowing that it is being tracked but still maintain the main message A document security device 108 may generate a unique identifier for the document by finding text or image positions (e.g., referred to herein as signature positions) within the document either automatically or manually by the user and at those positions, change the text or a feature of the text so that the change is not easily detectable. The change in text is different for each recipient and mappings of the unique identifier and a user identifier of the document may be stored in a security database such that when the user obtains a copy of the document from another source, the user can provide the document to the document security device 108. The document security device 108 can determine the original document, the position signature of where the changes are in the document, and what those changes are to determine the unique identifier. Once the unique identifier is determined, the document security device 108 may query the mappings in the security database to determine the mapped user identifier and return that to the user of the user device 102. While the document security device 108 is described as standalone service (e.g., operating via an application programming interface (API) with the service provider device 106), the document security may be included in the service provided by the service provider device 106, some of the operations may be performed on the user device 102, or some other combination. While a specific example of the document security system 100 is illustrated, one of skill in the art in possession of the present disclosure will recognize that a wide variety of document security systems having various configurations of networks, user devices, service provider devices, and document security devices that may operate to provide the systems and methods discussed herein without departing from the scope of the present disclosure.

Figure 2:
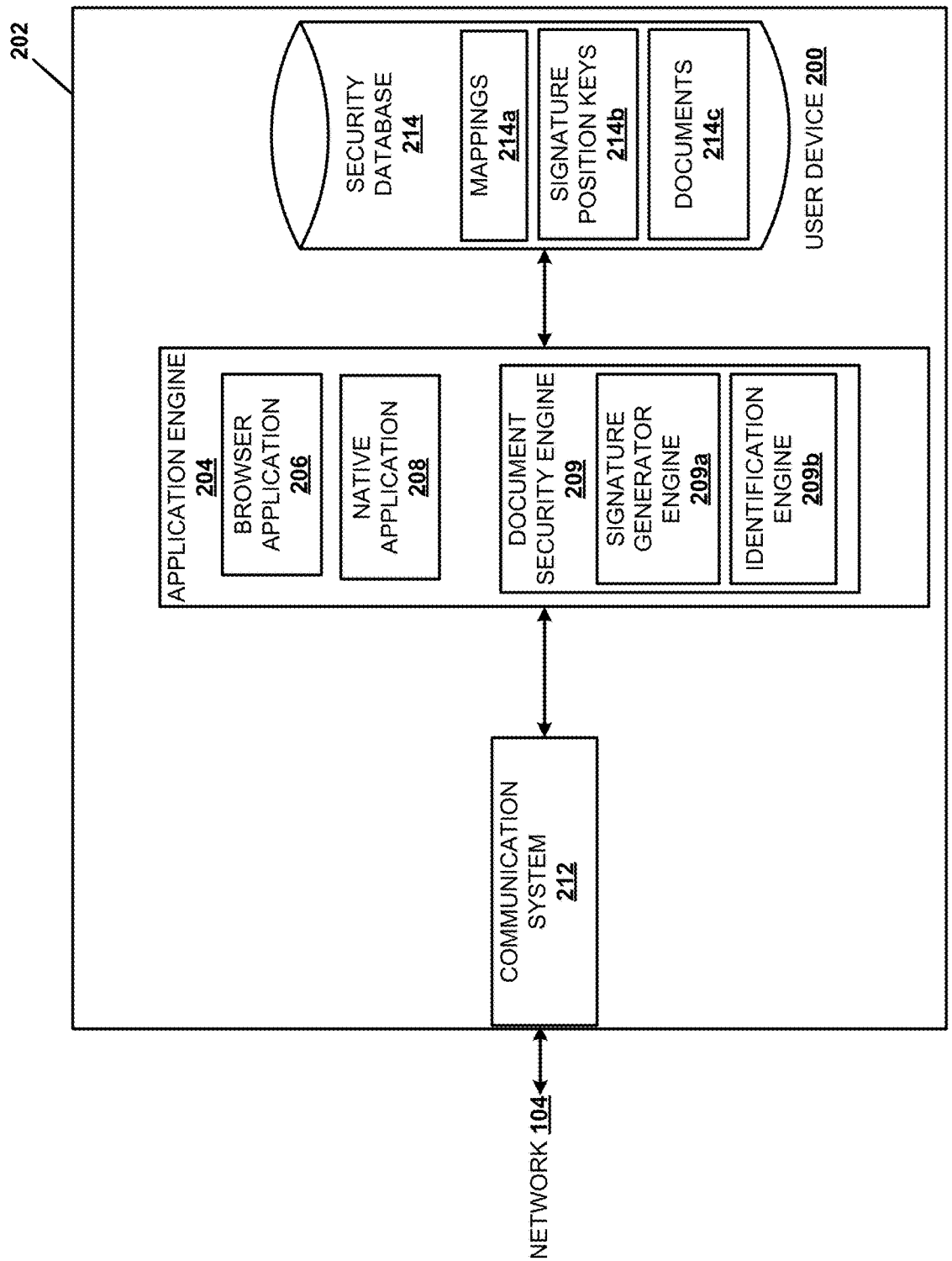
FIG. 2 is a schematic view illustrating an embodiment of a user device used in the document security system of FIG. 1, in accordance with some embodiments of the present disclosure.

Referring now to FIG. 2, an embodiment of a user device 200 is illustrated that may be the user device 102 discussed above with reference to FIG. 1, and which may be provided by a desktop computing system, a laptop/notebook computing system, a tablet computing system, a mobile phone, a wearable device, and/or other user devices that would be apparent to one of skill in the art in possession of the present disclosure. However, one of skill in the art in possession of the present disclosure will recognize that the user device 200 may be provided by any of a variety of computing devices in the different examples discussed below. In the illustrated embodiment, the user device 200 includes a chassis 202 that houses the components of the user device 200, only some of which are illustrated in FIG. 2. For example, the chassis 202 may house a processing system (not illustrated) and a non-transitory memory system (not illustrated) that includes instructions that, when executed by the processing system, cause the processing system to provide an application engine 204 that is configured to perform the functions of the application engines and user devices discussed below. In a specific example, the application engine 204 is configured to provide a browser application 206 and/or a native application 208, although one of skill in the art in possession of the present disclosure will recognize that other applications and computing device functionality may be enabled by the application engine 204 as well. In various embodiments, application engine 204 may be an operating system of a device (e.g. iOS™, Android™ OS, Windows™, etc.) or other application that provides a software application that may communicate with a service application on a server device. In various embodiments, the application engine 204 may include a document security engine 209 that is configured to perform the functions of the document security engines and user devices discussed below.

In a specific example, the document security engine 209 is configured to provide a signature generator engine 209*a* and an identification engine 209*b*, discussed below, although one of skill in the art in possession of the present disclosure will recognize that other applications and computing device functionality may be enabled by the document security engine 209 as well. For example, the signature generator engine 209*a* may be configured to generate a unique identifier for a distributed document and store a mapping of the unique identifier to a user identifier of the recipient of a copy of document where text has been changed to create the unique identifier.

The chassis 202 may further house a communication system 212 that is coupled to the application engine 204 (e.g., via a coupling between the communication system 212 and the processing system). The communication system 212 may include software or instructions that are stored on a computer-readable medium and that allow the user device 200 to send and receive information over the network 104. The chassis 202 may also house a storage system that includes a security database 214 that is coupled to the application engine 204 (e.g., via a coupling between the storage system and the processing system). The security database 214 may store mappings 214*a* of user identifiers to unique identifiers of documents, signature position keys 214*b*, or documents 214*c* (e.g., the original document and in some cases the copies that include the unique identifier, discussed below). While the security database 214 has been illustrated as housed in the chassis 202 of the user device 200, one of skill in the art will recognize that it may be connected to the application engine 204 through the network 104 without departing from the scope of the present disclosure.

Figure 3:
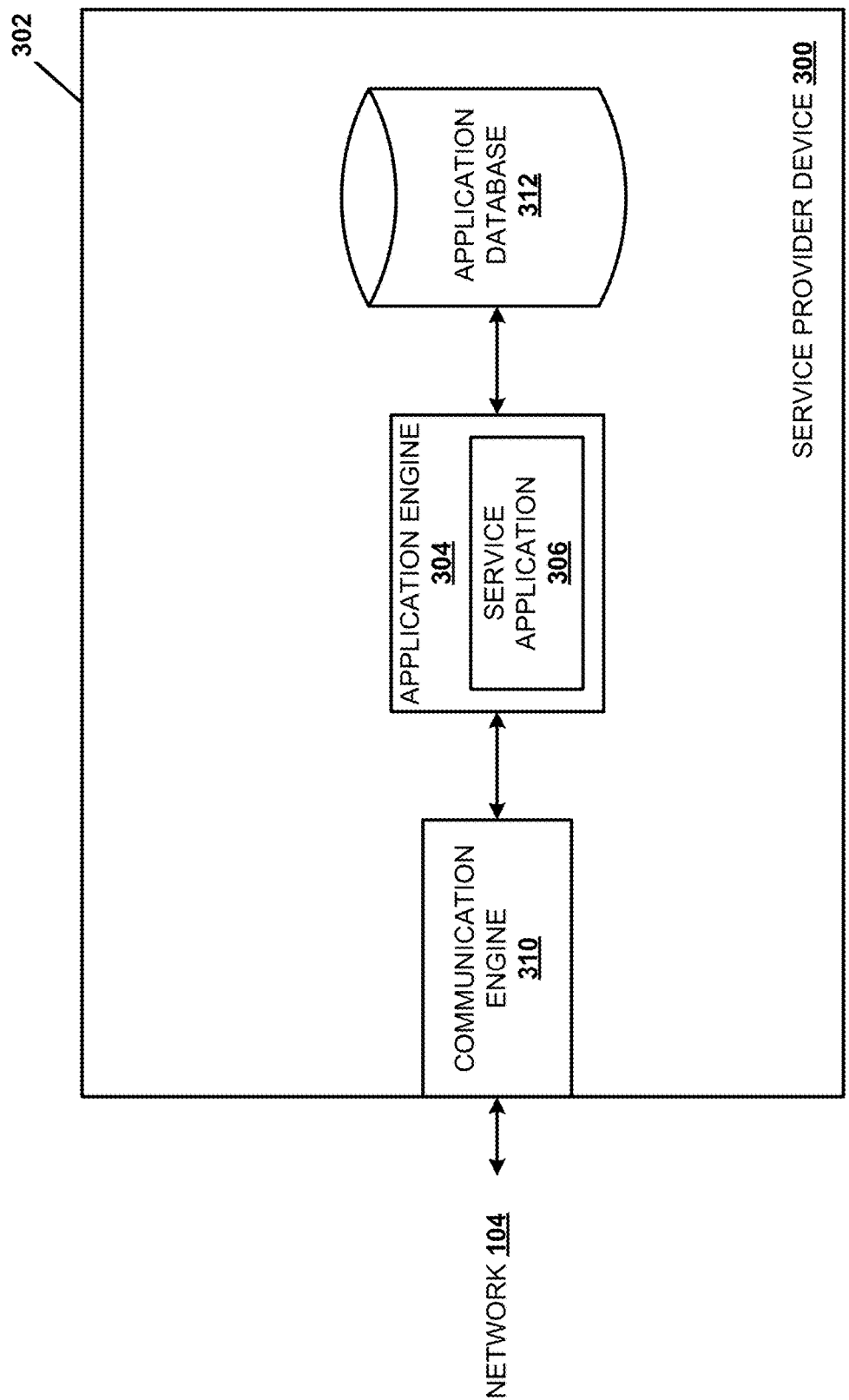
FIG. 3 is a schematic view illustrating an embodiment of a service provider device in the document security system of FIG. 1, in accordance with some embodiments of the present disclosure.

Referring now to FIG. 3, an embodiment of a service provider device 300 is illustrated that may be the service provider device 106 discussed above with reference to FIG. 1, and which may be provided by one or more server devices. In a specific example, the service provider device 300 may be controlled by a document storage service provider, an electronic mail service provider, a social media service provider or other service provider that would be apparent to one of skill in the art in possession of the present disclosure. In the illustrated embodiment, the service provider device 300 includes a chassis 302 that houses the components of the service provider device 300, only some of which are illustrated in FIG. 3. For example, the chassis 302 may house a processing system (not illustrated) and a non-transitory memory system (not illustrated) that includes instructions that, when executed by the processing system, cause the processing system to provide an application engine 304, such as an operating system, that is configured to perform the functions of the application engines and the service provider devices discussed below. In a specific example, the application engine 304 is configured to provide a service application 306 (e.g., a software application that provides a service to a client device) discussed below, although one of skill in the art in possession of the present disclosure will recognize that other applications and computing device functionality may be enabled by the service application engine 306 as well.

The chassis 302 may further house a communication system 310 that is coupled to the application engine 304 (e.g., via a coupling between the communication system 310 and the processing system) and that is configured to provide for communication through the network 104 as detailed below. The chassis 302 may also house a storage system that includes an application database 312 that is coupled to the application engine 304 (e.g., via a coupling between the storage system and the processing system). The application database 312 may store web pages, images, videos, audio, other content, user profiles, user identifiers, user permissions, user information, user account information, user transaction information, documents, or other data used by the service application engine 306 to provide services and perform the document functionality discussed below. While the application database 312 has been illustrated as housed in the chassis 302 of the service provider device 300, one of skill in the art will recognize that the application database 312 may be connected to the service application engine 306 through the network 104 without departing from the scope of the present disclosure.

Figure 4:
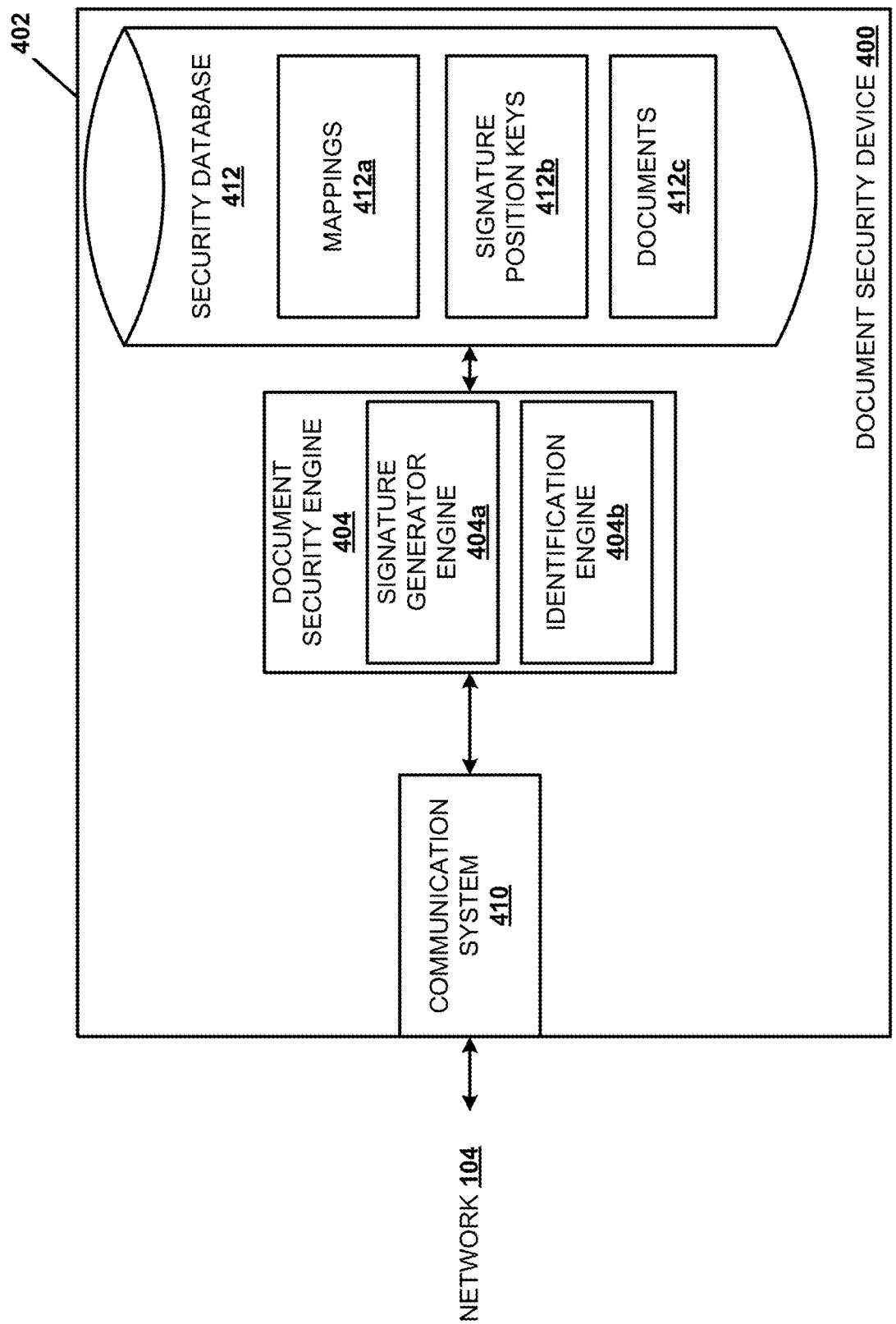
FIG. 4 is a schematic view illustrating an embodiment of a document security device in the document security system of FIG. 1, in accordance with some embodiments of the present disclosure.

Referring now to FIG. 4, an embodiment of a document security device 400 is illustrated that may be the document security device 108 discussed above with reference to FIG. 1, and which may be provided by one or more server devices or other computing devices. In the illustrated embodiment, the document security device 400 includes a chassis 402 that houses the components of the document security device 400, only some of which are illustrated in FIG. 4. For example, the chassis 402 may house a processing system (not illustrated) and a non-transitory memory system (not illustrated) that includes instructions that, when executed by the processing system, cause the processing system to provide a document security engine 404 that is configured to perform the functions of the document security engines and the document security devices discussed below.

In a specific example, the document security engine 404 is configured to provide a signature generator engine 404*a* and an identification engine 404*b*, discussed below, although one of skill in the art in possession of the present disclosure will recognize that other applications and computing device functionality may be enabled by the document security engine 404 as well. For example, the signature generator engine 404*a* may be configured to generate a unique identifier for a distributed document and store a mapping of the unique identifier to a user identifier of the recipient of a copy of document where text has been changed to create the unique identifier.

The chassis 402 may further house a communication system 410 that is coupled to the document security engine 404 (e.g., via a coupling between the communication system 410 and the processing system) and that is configured to provide for communication through the network 104 as detailed below. The chassis 402 may also house a storage system that includes a security database 412 that is coupled to the document security engine 404 (e.g., via a coupling between the storage system and the processing system). The security database 412 may store mappings 412*a*, signature position keys 412*b*, documents 412*c*, or any other instructions or data that would be apparent to one of skill in the art in possession of the present disclosure to perform the unique identifier generation and identification functionality, discussed below. While the security database 412 has been illustrated as housed in the chassis 402 of the document security device 400, one of skill in the art will recognize that the security database 412 may be connected to the document security engine 404 through the network 104 without departing from the scope of the present disclosure.

Figure 5:
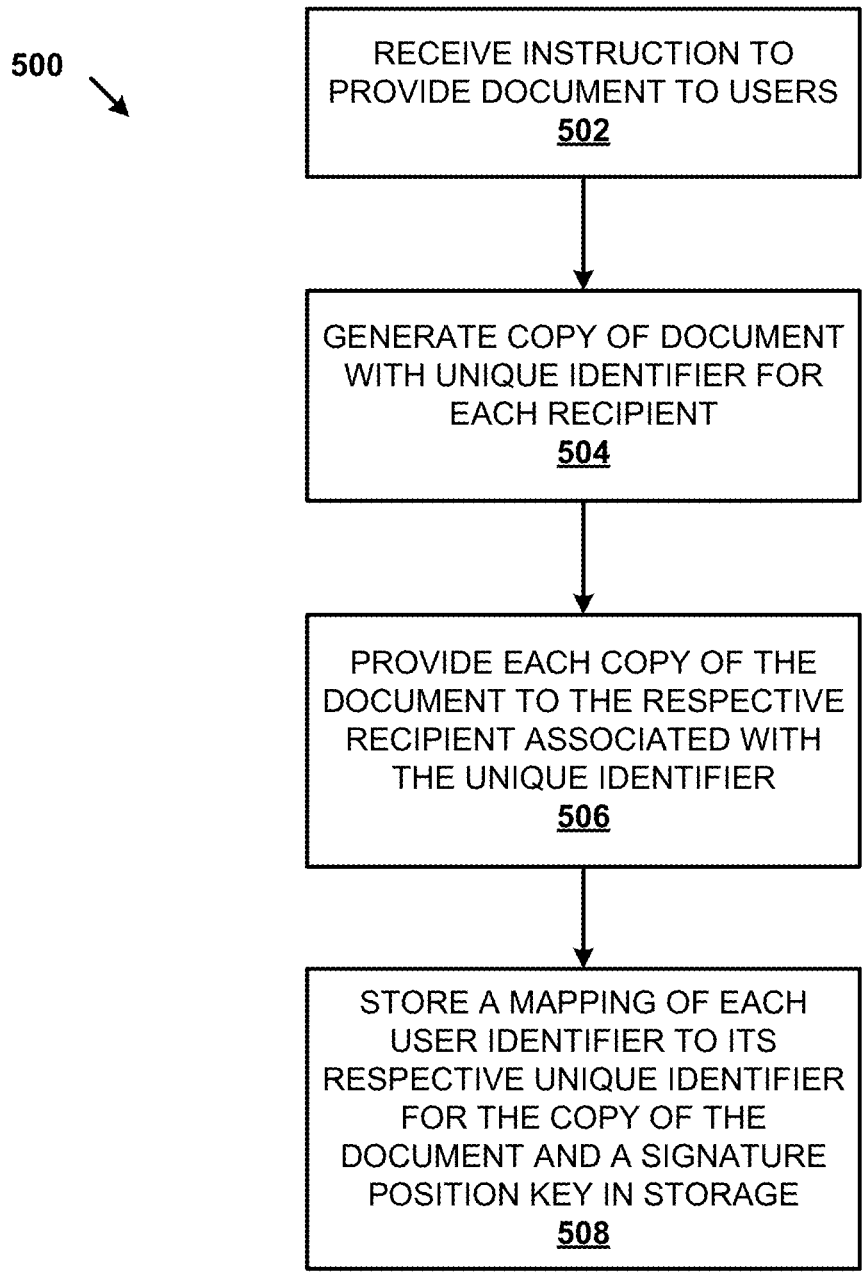
FIG. 5 is a flowchart illustrating a method of unique identifier generation for a copy of an electronic text document, in accordance with some embodiments of the present disclosure.

Referring now to FIG. 5, a method 500 for unique identifier generation for an electronic text document is illustrated according to various embodiments. Operations described relative to FIG. 5 may be performed, in various embodiments, by any suitable computer system and/or combination of computer systems, included in document security system 100. For convenience and ease of explanation, however, operations described below will simply be discussed relative to the document security device 108/400. Further, various elements of operations discussed below may be modified, omitted, and/or used in a different manner or different order than that indicated. Thus, in some embodiments, the document security device 108/400 may perform one or more aspects described below, while another system might perform one or more other aspects. For example, the user device 102/200 may be configured to perform the operations discussed herein by itself or in combination with the document security device 108/400.

The method 500 may begin at block 502 where distribution instruction to provide an electronic text document to a plurality of users is received. In an embodiment, at block 502, a user of one of the user devices 102/200 may provide distribution instruction to the application engine 204 via the browser application 206 or the native application 208 to provide an electronic text document to other users. For example, the user may create an electronic text document, an electronic mail, or other document that may be sent or made available to other users. For example, the instruction may be to send the electronic mail document or saving an electronic text document to a shared database where the electronic text document has permission to allow a plurality of other users to access the electronic text document. In other examples, the electronic text document may be social media post or other post that is distributed to individual users. The electronic text document may include text characters or images. Text characters may include spaces, letters, punctuations, numbers, symbols or other characters that would be apparent to one of skill in the art in possession of the present disclosure. The text may be presented in various characteristics such as fonts, font sizes, font colors, highlighting, font effects, formatting characteristics (e.g., line spacing, indentations, or the like), text strings such as words and words in lists with comma sequences, or other characteristics that would be apparent to one of skill in the art in possession of the present disclosure. The electronic text document may also include one or more images or image files that are embedded in the document or drawn on the document. While a few electronic document presentation features are described, other presentation features to convey information or provide decoration may be used in the embodiments of the present disclosure.

In various embodiments, the instructions may include a security instruction to create a unique identifier that is embedded in the document for each respective user that is to receive the electronic text document. The user may want to provide security to the electronic text document or track a document to later determine how the document is distributed. The user usually wants the unique identifier to be hidden such that it is not easily apparent to the recipient user that the document is being tracked and has the unique identifier embedded in it. For example, a user sending an electronic mail document that includes confidential information may want to trace that electronic mail document to a recipient of that electronic mail document if the electronic mail document is later found to be in the possession of an entity that was not provided the original communication. Specifically, a recipient of a confidential electronic email document may provide the electronic email document or a portion of that document to the press, or the recipient may post the electronic email document on social media where it is further disseminated.

In various embodiment, the security instruction may be included in the distribution instruction (e.g., when a user selects send or saves the document) or the security instruction may be provided before the distribution instruction (e.g., once the user drafts an electronic mail document, the user may provide security instruction (e.g., selecting a button or other user interface option) prior to sending the electronic mail document to the recipients). The document security engine 209/404 may be a plugin or other application interfacing with the browser application 206 or native application 208 as an avenue to provide security instruction. In other embodiments, the document security engine 209 may interface with the service application 306 of the service provider device 300 via an application programming interface (API). In yet another embodiment, the document security engine 209 may communicate with the document security device 108/400 that may then in turn perform the communication with the service provider device 106/300 via the network 104 and an API. In yet other embodiments, the document security engine 209 may be included in the code of the service application 306 at the service provider device 106/300 or an application for the document production application at the user device 102/200. As such, the document security engine 209/404, through which security instructions, are received may be at various computing devices or distributed across the various computing device without departing from the scope of the present disclosure.

The method 500 may proceed to block 504 where in response to the security instruction a respective copy of the electronic text document for each user of the plurality of users is generated. In an embodiment, at block 504, the signature engine 404a of the document security engine 404/209 may receive the security instructions and in response, generate a copy of the electronic text document for each user of the plurality of users that are to obtain the electronic text document. Particularly, the signature engine 404a may receive the security instruction, the electronic text document, a set of user identifiers (e.g., email addresses, employee identifiers, social security numbers, phone numbers, usernames, or the like) of users that are to obtain the electronic text document, or other information.

The signature generator engine 404a may determine a number of positions and where those positions are located within the electronic text document where a change in a presentation of at least one character or at least one image included in the electronic text document is to be present. Each of the positions may be referred to herein as signature positions. A number of positions determined may be based on a number of users of the plurality of users or a number of changes that the at least one character of text or the at least one image can undergo. For example, if the user is to send an email to 10,000 users, that user wants to send each one of them a unique email. For example: "'!' and '.' Would be 2". And 'Green', 'Black', 'Blue', and 'Purple' would be 4". Where "n" being the number of times there are two possible signatures/presentation changes or four possible signatures/presentation changes, respectively. The presentation change of the at least one text character or at least one image included in the electronic text document may include at least one of a change in background color of a text string or character, a change in a punctuation mark that maintains grammatical correctness, a change in a position/order of text strings in a list of text strings (e.g., a, b, and c may be changed to b, c, and a), a change in font color, a change in font style, a change in font size, a change in font, a change in spelling of a text string, a change in abbreviation, a change in spacing, a steganography message within a plurality of pixels of the at least one image, or other change that would be apparent to one of skill in the art in possession of the present disclosure.

If only 2" is used, (one static number of signatures (e.g., presentation changes) per signature position) the user would only need a total of 14 signature positions (that being n) to achieve 10,000+ user emails. For 3", it is only 9 signature positions (e.g., 39=19,683). For 4", it is only 7 signature positions (e.g., 47=16,384). For 5", it is only 6 signature positions (e.g., 56=15,625). In actuality, varying amounts of potential presentation changes per position are more likely. The following equation below may define the number signature positions needed and presentation changes that are needed in order to send out enough unique emails to all the recipients:

\# of Recipients =

$$NumOfSigs1^{NumOfOccurances1} * NumOfSigs2^{NumOfOccurances2} * \ldots * Xn^{On}$$

$$\text{\# of Recipients} = X1^{O1} * X2^{O2} * \ldots * Xn^{On}$$

$$\text{\# of Recipients} = X1^{O1} * X2^{O2} * \ldots * Xn^{On}$$

"X1" to "Xn" represent the number of presentation changes in each signature position. "O1" to "On" represent the number of signature positions with the corresponding number of position changes.

For example, if there are 2 signatures/presentation changes in 3 different signature positions, 3 signatures in 4 different signature positions, and 4 signatures in 2 different signature positions, then there would be 10368 possible unique emails that could be sent out to recipients.

$$\text{\# of Recipients} = X1^{O1} * X2^{O2} * \ldots * Xn^{On}$$

$$\text{\# of Recipients} = 2signatures^{3\,times} * 3signautes^{4\,times} * 4signatures^{2\,times}$$

$$10368 \text{ possible recipients} = 2^3 * 3^4 * 4^2$$

One other important thing to note is how to determine, for the re-ordering signature, how many non-repeatable unique combinations there are. The following formula shows how this determination can be made.

$$n! = n*(n-1)*(n-2)* \ldots *2*1$$

Where "!" represents the factorial function, which multiplies all the positive integers from n down to 1.

Using this formula, the number of possible orders for 3 items is:

$$3! = 3 \times 2 \times 1 = 6$$

The number of possible orders for 4 items is:

$$4! = 4 \times 3 \times 2 \times 1 = 24$$

In various embodiments, the signature generator engine 404a may also determine the signature positions in conjunction with the number of positions that will satisfy the number of recipients. In some embodiments, the signature generator engine 404a may include an artificial intelligence engine such as a large language model or a predefined position algorithm to determine where in the document that the signature positions where the change in the presentation of the at least one character or the at least one image included in the electronic text document are located. For example, signature generator engine 404a may parse the electronic text document into a plurality of portions. The signature generator engine 404a may then determine a reproduction likelihood score for each of the plurality of portions. The reproduction likelihood score identifies a likelihood that that portion is to be reproduced. For example, the signature generator engine 404a may determine where the most noteworthy text is located and give that portion a high reproduction likelihood score. Other sections, like an introduction or a closing sentence or paragraph, may be given a low reproduction likelihood score. The signature generator engine 404a may then select a first set of portions of the plurality of portions based on the reproduction likelihood score in which the signature positions may be determined. Once the number of signature positions and the location of the signature positions are determined, the signature generator engine 404a may then change the at least one character of text or the at least one image in the signature positions so that each user has a unique combination of changes in presentation of the at least one character or the at least one image included in the electronic text document, which is referred to herein as the unique identifier. The signature generator engine 404a may then store the one or more signature positions of the at least one character of text or at least one image in the security database 412 as the signature position key 412b.

In various embodiments, the user may select the 'level of identification' on an email being sent out. For example: a "Low Level of Identification" may include just one set of unique identifiers and signature positions to identify an electronic text document. A "Medium Level of Identification" may include two or more sets of unique identifiers. A "High Level of Identification" may include three or more sets of unique identifiers that are greater than the "Medium Level of Identification." The signature positions for each set of unique identifiers may be different. In various embodiments, more levels of identification may be implemented.

Often times when these document leaks occur, the user is taking a picture of the document contents with their phone or other user device. The user may not obtain the entire content of the document when the user captures the image. As such, when the user does not capture all the electronic text content document in the photo, there is the risk of cutting off some signature positions and not being able to fully identify the user. As such, by including multiple identifiers in the electronic text document, more layers of unique identifiers may result in more possible identification points, where at least one of the unique identifiers may be obtained or portions of each unique identifier may be used to potentially determine the associated user (e.g., the portions become a unique identifier in themselves). As such, by using multiple layers of unique identifiers, a user can narrow down the list of potential leakers if not all signature positions are available.

In some embodiments, the low-level identification may be default where signatures start from top to bottom of the electronic text document. The medium-level identification may include the next level of identification where it does not overlap with the first low-level identification layer and goes from bottom to top. For example, the leaker may only find the first half of the email leak worthy, the top half of the email will have both low-level and medium-level signatures spread throughout. Same for the bottom half. For the high-level identification, may ensure it does not overlap with the first two layers (e.g., being randomly spread out with an emphasis of having initial and final signature positions may end up in middle). While three levels are described, two levels or more than three levels may be contemplated depending on the user preference, document complexity, length of doc, or number of potential signature positions and still fall under the scope of the present disclosure.

With this in place, signatures from one layer may be matched to another to be able to finish the unique identifier. Using the medium level of identification as an example, the first layer goes from TOP to BOTTOM while the second layer goes from BOTTOM to TOP. FIG. 10 illustrates an example leak with unique identifier layers. The leaker in this example only leaked the first half of the email but a user is still able to deduce the leaker from signature position of the two layers that are included in the leaked portion of the email. While one unique identifier including a plurality of signatures throughout the electronic text document may only allow the identification engine 404b (discussed below) to determine a set of recipient users, a portion of the second unique identifier in conjunction with the first unique identifier may allow the identification engine 404b to determine the user recipient via the union of the signature positions for the unique identifiers or narrow the user down to a smaller set of user recipients.

In yet other embodiments, users may be associated with a taxonomy such that they are associated with a hierarchy. For example, at the first level the user may be associated with a business unit, then a department, a manager, and so on or other levels therein. Each level of the hierarchy/taxonomy be associated with a different signature/position within the electronic text document. As such, if one of the signature positions is missing from the reproduced electronic text document, one of the levels may be determined. If multiple unique identifiers/levels for an electronic document are used and one of the signatures positions is missing for a first unique identifier and the second unique identifier is not complete, then, if available in the leaked or tracked document, the signature position of the second unique identifier that corresponds with the hierarchy level of the missing signature position in the first unique identifier may be used to complete the identification of the user.

Once the signature positions and possible character changes are determined, the document security engine 209 may generate a copy of the electronic text document for each user. The copy may include a unique identifier based on a change in presentation of at least one of at least one character of text or at least one image included in the electronic text document that is different than those in another copy of the electronic text document. In some embodiments, such as in the instance where an electronic document is stored and later accessed by a user, every time a new user accesses the document a copy of the original electronic text document may be generated according to block 504. As more and more users access the document, the number of signature positions may increase to accommodate the limited number of unique identifiers each signature position in combination with the other signature positions can accommodate.

The method 500 may then proceed to block 506 where each respective copy of the electronic text document that includes the respective unique identifier is provided to the user associated with the user identifier associated with that respective copy of the electronic text document. In an embodiment, at block 506, the application engine 204 or 304 may provide each copy of the electronic text document including the unique identifier to the user associated with the copy. For example, if the electronic text document is an email or a test/assignment created by a teacher, each copy of the electronic text document may be provided to the recipients of that electronic mail document via the electronic mail service provider providing the service provider device 106/300. In another example, if the electronic text document is a document such as a spreadsheet, a slide presentation, a word processing document or the like, those copies may be stored in the application database 312 along with the user identifier associated with the copy and the unique identifier included in the copy for later retrieval.

The method 500 may then proceed to block 508 where a mapping of each user identifier to the respective unique identifier for the respective copy of the electronic text document is stored in a storage system. In an embodiment, at block 508, the signature engine 404a of the document security engine 404/209 may store a mapping 412a of each user identifier to the unique identifier included in that user's copy of the electronic text document. The storage system (e.g., the security database 214/412) may also store an identifier for the user that created the document, documents 214c/412c (e.g., the original electronic text document and, in some instances, the copies, signature position keys 214b/412b, or other information or data. In some embodiments, the unique identifier included in the mapping 412a may only include the signature positions and the at least one character of text or the at least one image included in the electronic text document that is changed in presentation. As such, the copy of the electronic text document does not need to be stored to reduce processing resources and storage requirements.

Figure 6A:
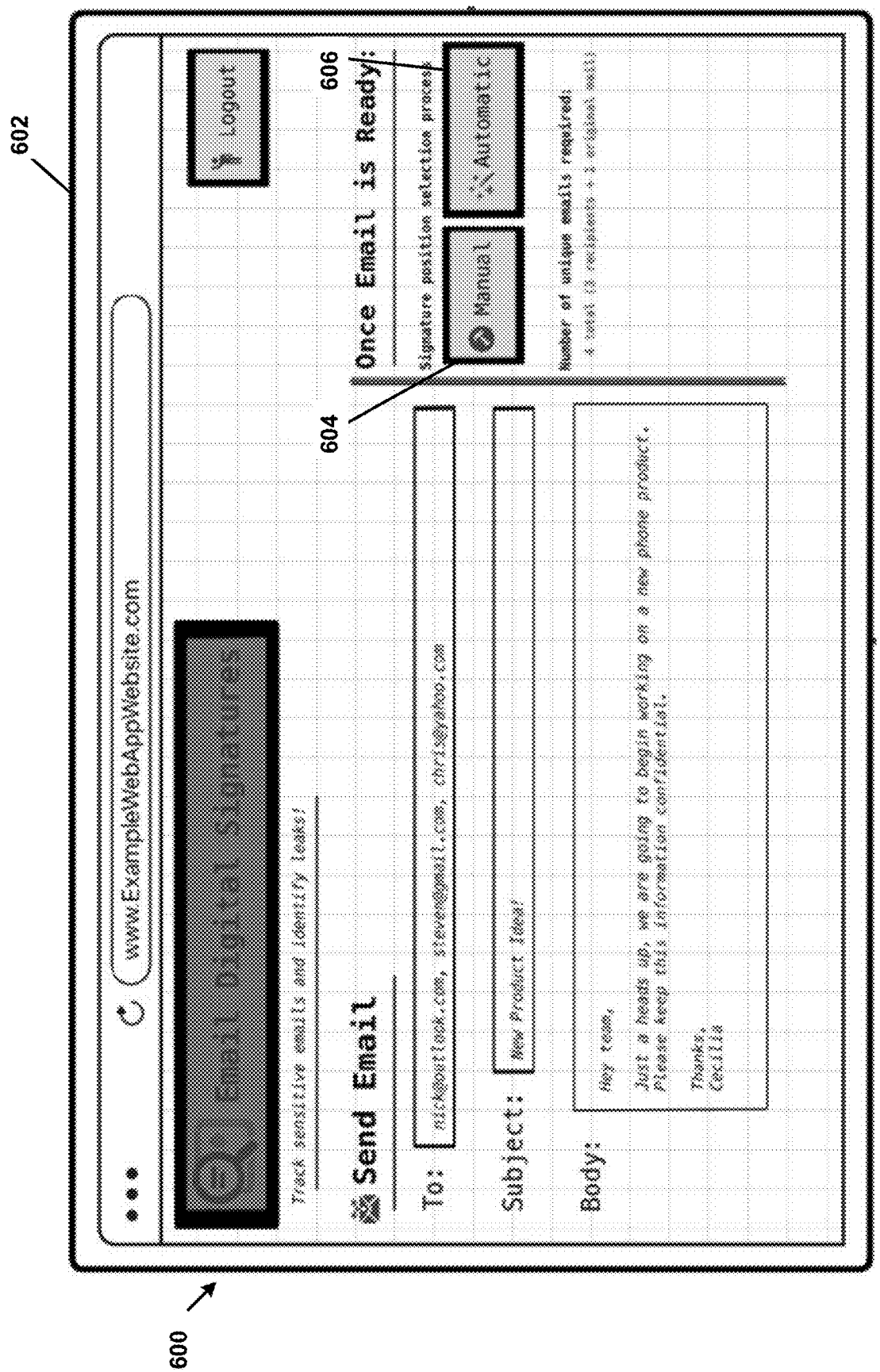
FIGS. 6A, 6B, 6C, and 6D are a sequence screenshots illustrating an embodiment of generating the unique identifier for a copy of an electronic text document during the method of FIG. 5, in accordance with some embodiments of the present disclosure.

Referring now to FIGS. 6A, 6B, 6C, and 6D, an example workflow of generating a unique identifier for electronic mail according to method 500 of FIG. 5 is illustrated. In FIG. 6A, an example electronic mail graphical user interface 600 is displayed via a browser application of a display device 602 of a user device 102/200. The user may draft an electronic mail document and select the number of recipients. In the illustrated example, the user has selected to send the electronic mail to three users. The user may then select whether to manually select the signature positions or have the signature generation engine 209a/404a automatically select the signature positions in the electronic mail (e.g., via manual button 604 or automatic button 606).

Figure 6B:
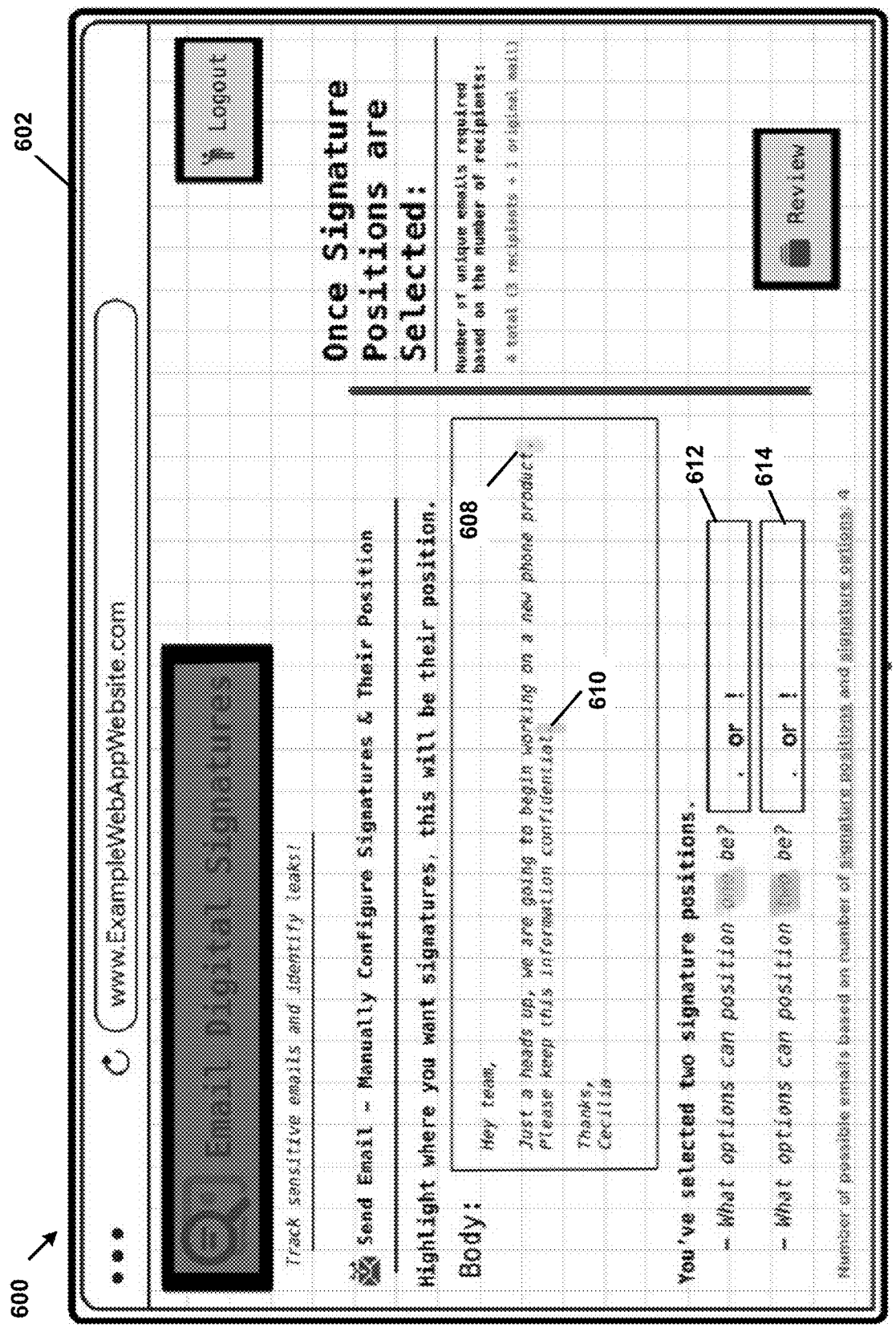
Figure 6C:
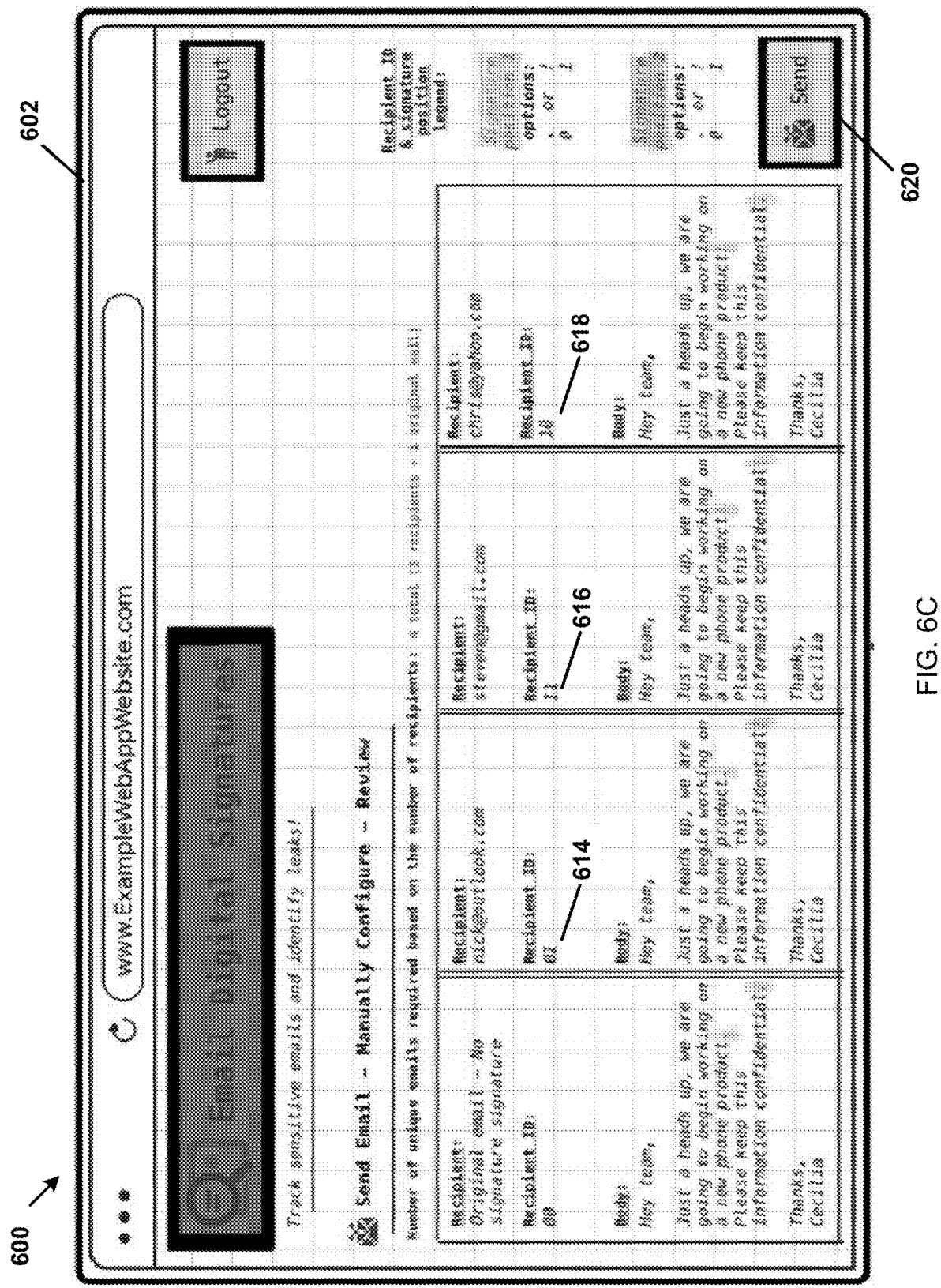
Figure 6D:
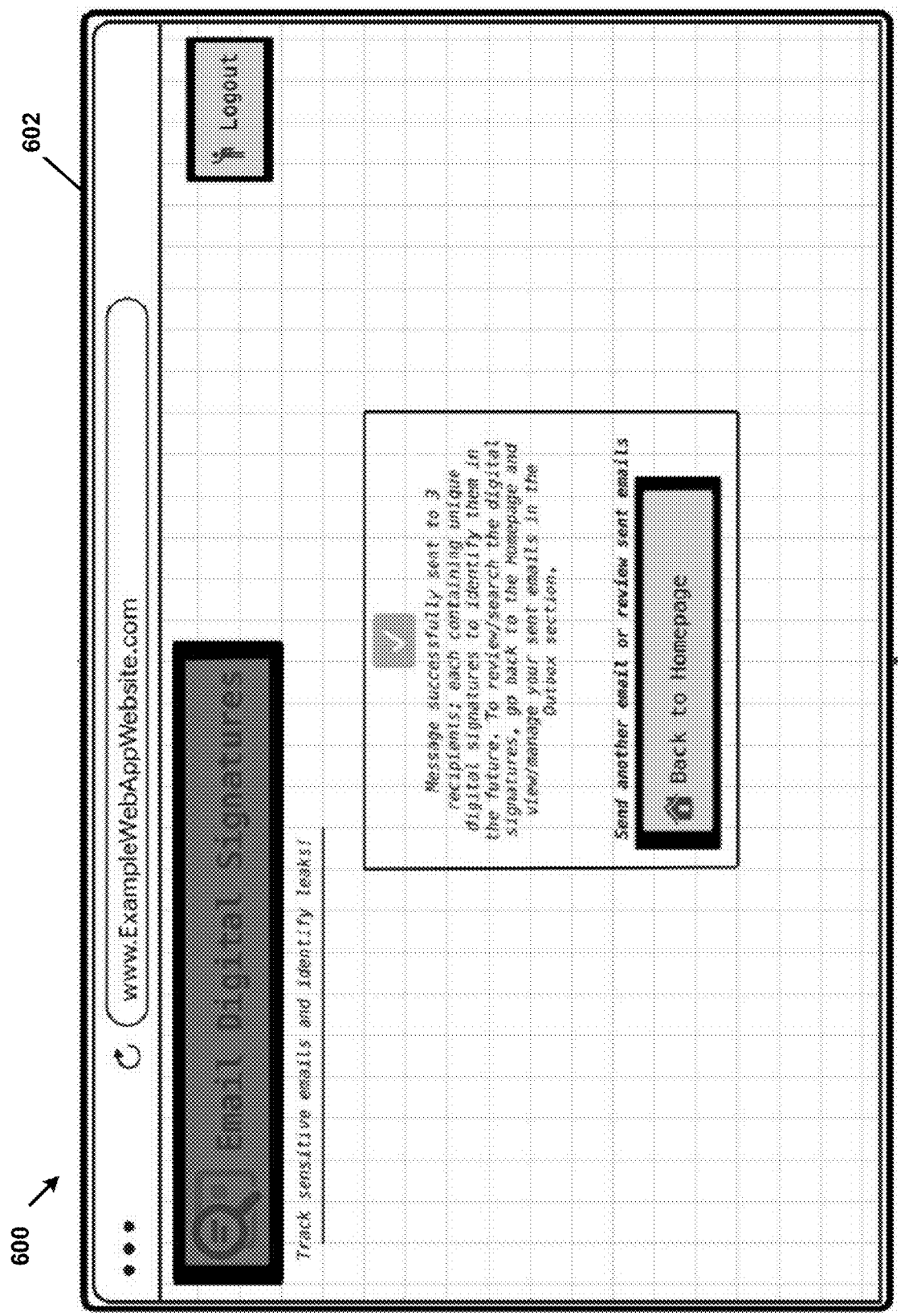

With reference to FIG. 6B, the user or the artificial intelligence algorithm may select two signature positions (e.g., position 608 and position 610), which are the punctuations. The user or the artificial intelligence algorithm may select the presentation options of the punctuations for position 608 in box 612 and the options for the punctions for position 610 in box 614. For both, the options may be either a ".'' or an "!". This will result in four unique emails to cover the original, and three copies, one for each of the three recipients, as illustrated in FIG. 6C. As such, each recipients' electronic mail has a unique identifier (e.g., 614, 616, and 618). The user may select a send button 620 and the three emails may be sent while the unique identifiers 614, 616, and 618 along with a user identifier of the respective users are saved in the mappings 212a/412a. FIG. 6D illustrates a confirmation that the copies of the electronic mail have been sent.

Figure 7:
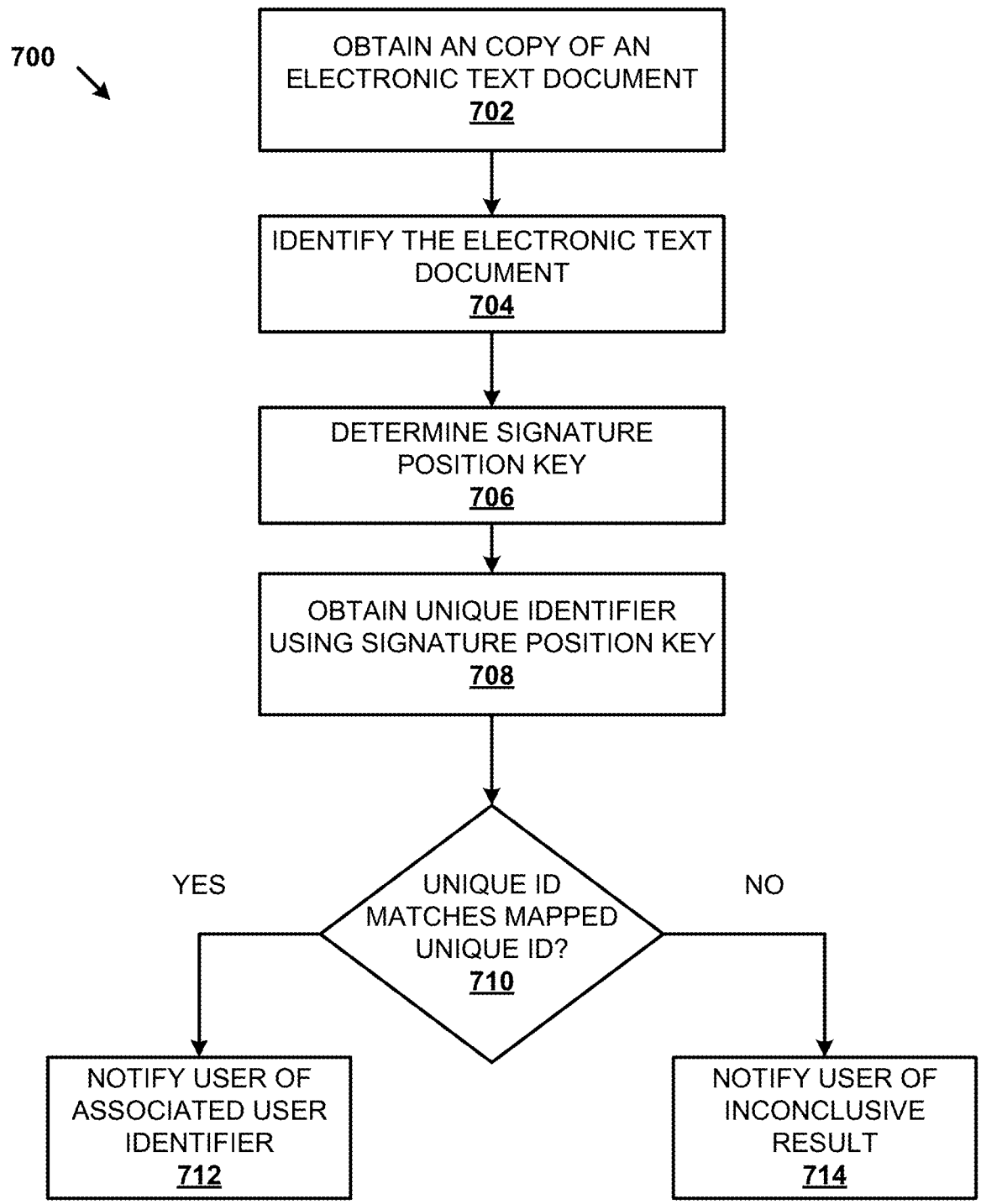
FIG. 7 is a flowchart illustrating a method of electronic text document, in accordance with some embodiments of the present disclosure.

Referring now to FIG. 7, a method 700 for document tracking is illustrated according to various embodiments. Operations described relative to FIG. 7 may be performed, in various embodiments, by any suitable computer system and/or combination of computer systems, included in document security system 100. For convenience and ease of explanation, however, operations described below will simply be discussed relative to the document security device 108/400. Further, various elements of operations discussed below may be modified, omitted, and/or used in a different manner or different order than that indicated. Thus, in some embodiments, the document security device 108/400 may perform one or more aspects described below, while another system might perform one or more other aspects. For example, the user device 102/200 may be configured to perform the operations discussed herein by itself or in combination with the document security device 108/400.

The method 700 may begin at block 702 where an electronic text document is obtained. In an embodiment, at block 702, a user that created copies of the electronic text document of method 500 or another user may obtain one of the copies of the electronic text document. In some embodiments, the copy may be the complete copy in the same format in which it was created. However, in other embodiments, the copy may be a partial copy such that a portion of the text is available or the copy may be an image including the entire copy or a portion of the copy. For example, the image may be a screenshot or a photo of the copy when it is being displayed on a display device of a user device 102. The copy of the electronic text document may be provided to the identification engine 404b of the document security engine 404. In various embodiments, the identification engine 404b may include a text extraction algorithm to extract text from images when the copy of the electronic text document is reproduced as an image (e.g., a screenshot or a photograph).

The method 700 may proceed to block 704 where an electronic text document is identified from the copy of the electronic text document that is obtained. In an embodiment, at block 704, the identification engine 404b may determine the original electronic text document from the obtained electronic text document. For example, the identification engine 404b may use the text from the obtained electronic text document to perform a search of stored electronic text documents (e.g., documents 214c/414c) where document security was added according to the method 500.

The method 700 may then proceed to block 706 where a signature position key for the electronic text document is determined. In an embodiment, at block 706, the identification engine 404b may determine a signature position key that is associated with the identified electronic text document. The stored original electronic text document may be associated with a signature position key 214b/412b that identifies the signature positions for the unique identifier.

The method 700 may then proceed to block 708 where a unique identifier is obtained from the copy of the electronic text document. In an embodiment, at block 708, the identification engine 404b may use the signature position key to obtain the unique identifier from the obtained copy of the electronic text document. The identification engine 404b may locate each signature position in the copy of the electronic text document obtained using the signature position key and obtain the visual representation of the text at those signature positions. The unique identifier can be reconstructed from those signature positions. As discussed above, the obtained copy of the electronic document may only include a portion of the copy of the electronic document. For example, the obtained copy of the electronic document may only include two of four paragraphs that were in the copy of the electronic document. As such, the obtained unique identifier may only include a portion of the unique identifier.

The method 700 may then proceed to decision block 710 where it is determined whether the unique identifier matches a mapped unique identifier of a plurality of mapped unique identifier included in the mappings stored in the storage system. In an embodiment, at decision block 710, the identification engine 404b may compare the obtained unique identifier to unique identifiers stored in the mappings 412a for the particular electronic text document. If there is a match or a match to a portion of the unique identifier at available signature positions, the method 700 may proceed to block 712 where a user identifier that is associated with the mapped unique identifier is provided. In an embodiment, at block 712, the identification engine 404b may return the user identifier that is associated with the unique identifier to the user that is attempting to track the electronic text document or determine a leak of the electronic text document. In some embodiments, where the unique identifier is not complete, all possible users or a higher level of identification (e.g., a department rather than an individual) may be returned.

If there is no match or a match does not satisfy threshold number of signature positions of the unique identifier at decision block 710, the method 700 may proceed to block 714 where a default notification is provided to the user indicating that the results are inconclusive. In an embodiment, at block 714, the identification engine 209b/404b may return a default message to the user indicating that the unique identifier obtained from the obtained copy of the electronic text document does not satisfy a threshold of certainty or does not match any of the stored unique identifiers. In some cases, the copy obtained may be so incomplete that it did not capture any or most of the signature positions. In other situations, the user may have edited the document such that the text information has changed at the signature positions to something that makes identifying the user impossible. In some embodiments, where the unique identifier is not complete, all possible users or a higher level of identification (e.g., a department rather than an individual) may be returned.

Figure 8A:
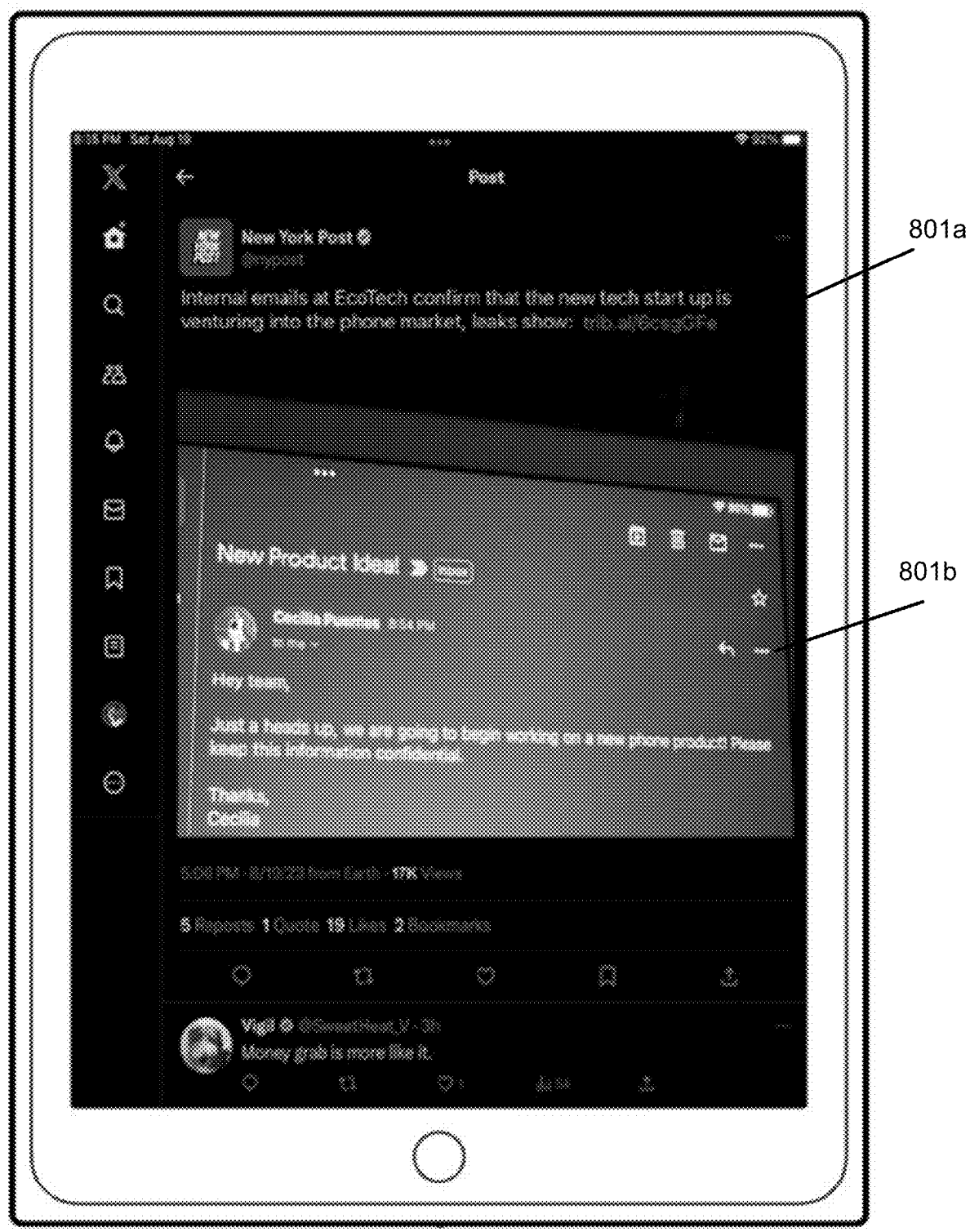
FIGS. 8A, 8B, 8C, 8D, and 8E are a sequence screenshots illustrating an embodiment of tracking an electronic text document tracking the method of FIG. 7, in accordance with some embodiments of the present disclosure.
Figure 8B:
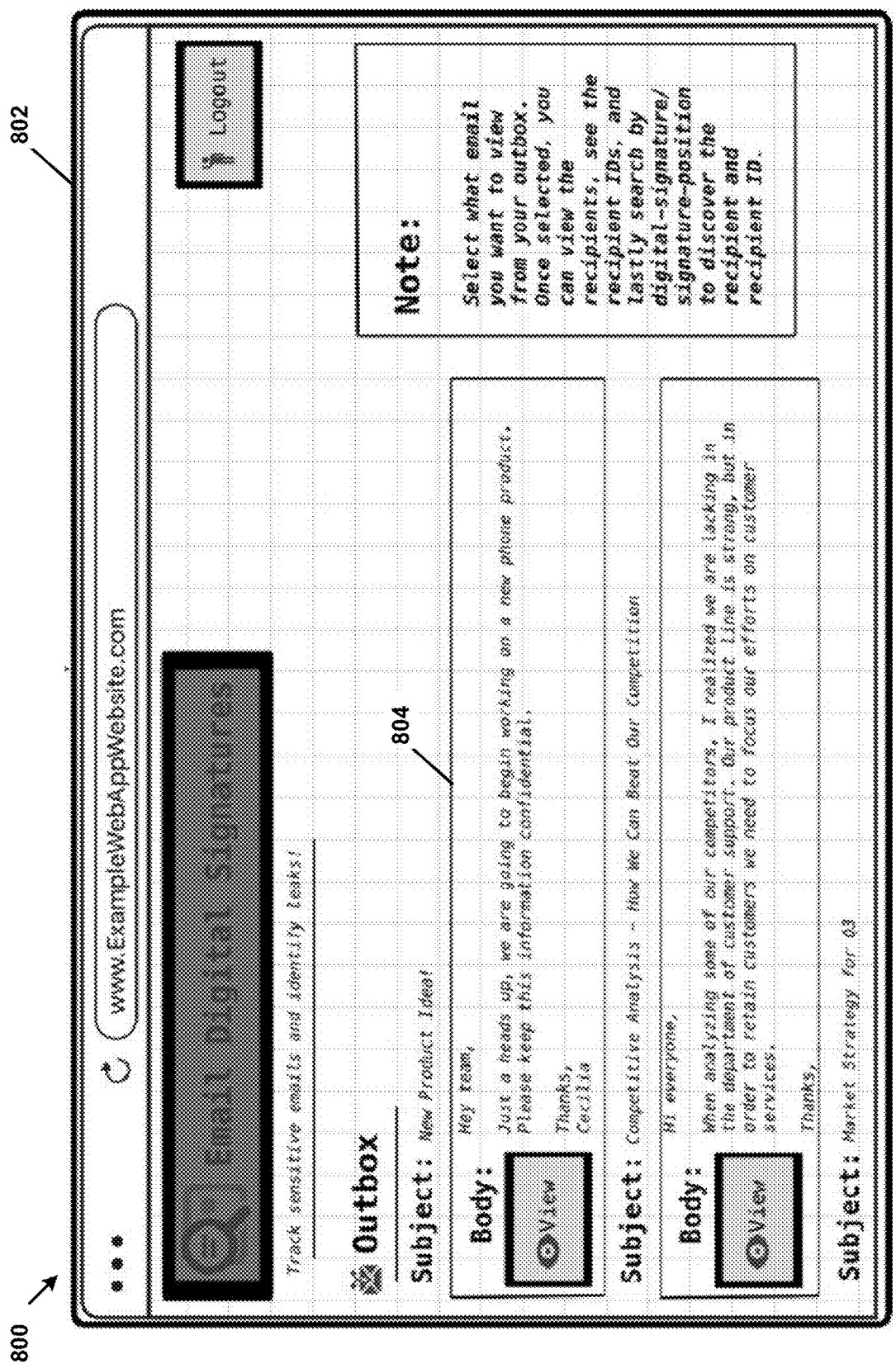
Figure 8C:
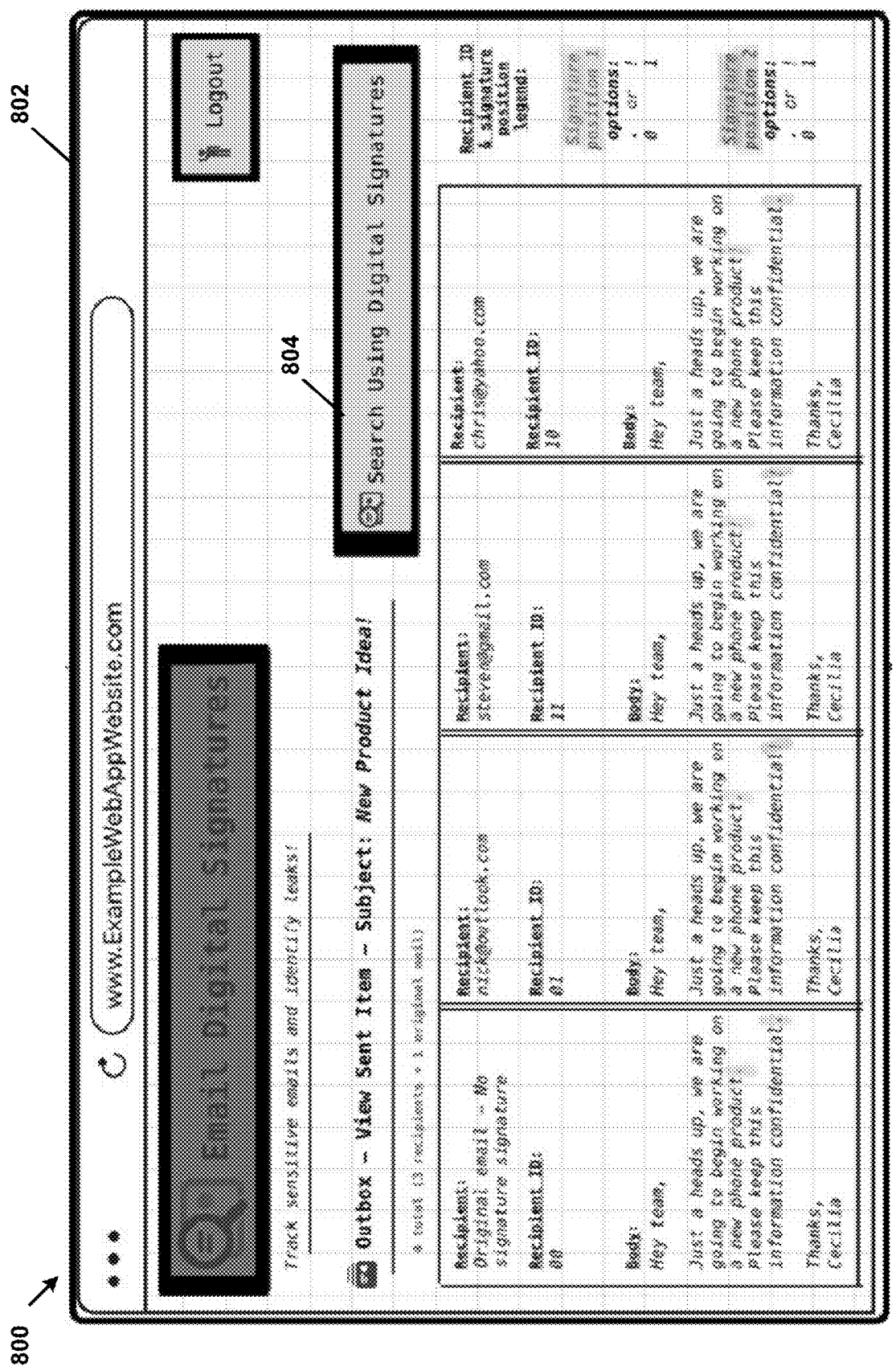

Referring now to FIGS. 8A, 8B, 8C, 8D, and 8E an example workflow of document tracking according to method 700 of FIG. 7 is illustrated. FIG. 8A illustrates an example post 801a of a screenshot 801b of the electronic mail distributed in the example of FIGS. 6A-6D. The screenshot demonstrates how leakers will often take pictures of the confidential email on their screen with an external device and then post the screenshot 801b on a social media platform. In FIG. 8B, an example electronic mail graphical user interface 800 is displayed via a browser application of a display device 802 of a user device 102/200. The user may obtain one of the emails that were sent to the recipients discussed in the example of FIGS. 6A-6D. In FIG. 8B, the user may recognize the obtained email and locate the original email in an outbox. The user may select email 804 (continuing with the example of FIGS. 6A-6D). In FIG. 8C, the emails sent with unique identifiers are displayed as well as the signature positions. The user may select "Search Using Digital Signatures" button 806.

Figure 8D:
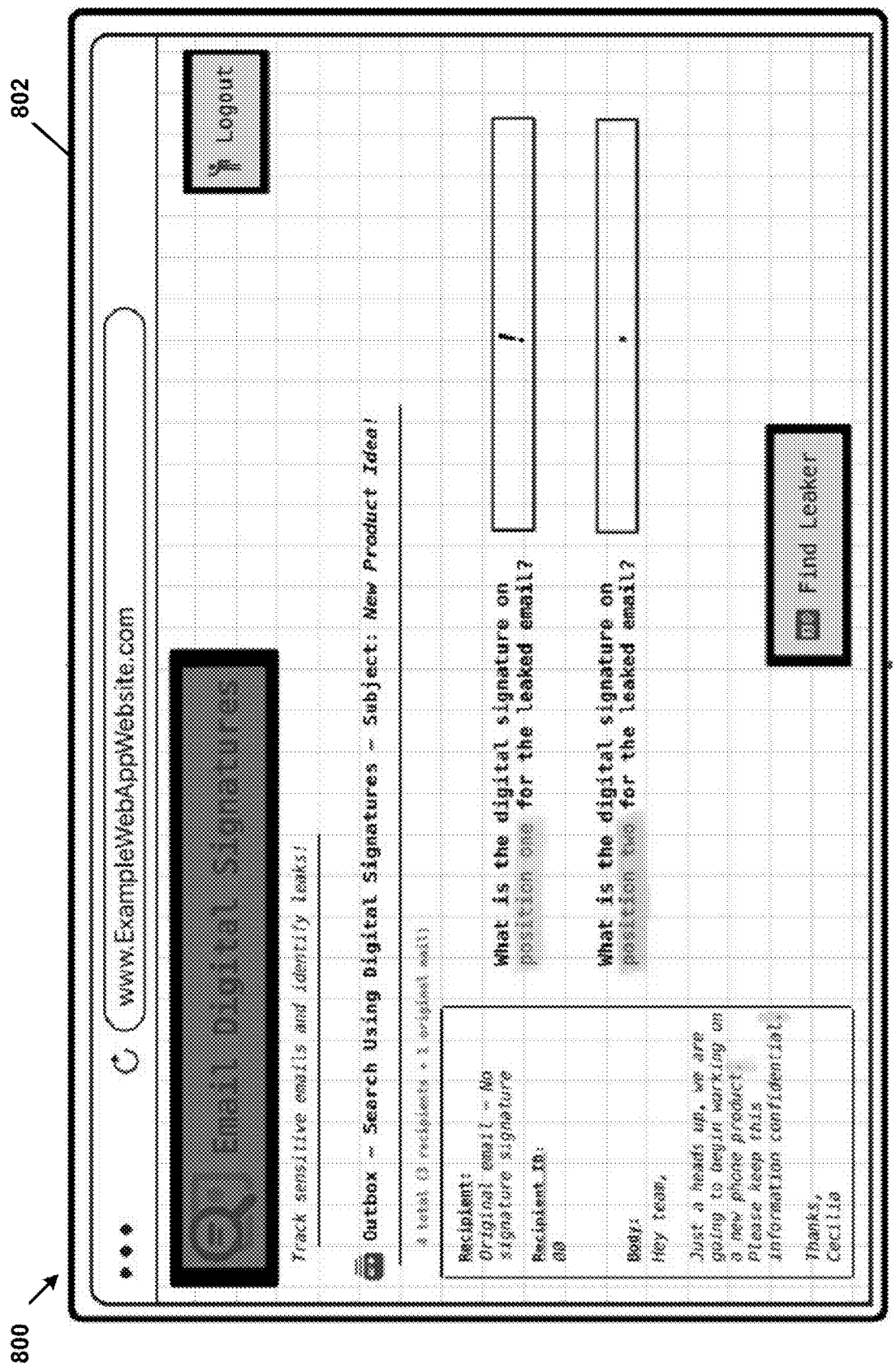
Figure 8E:
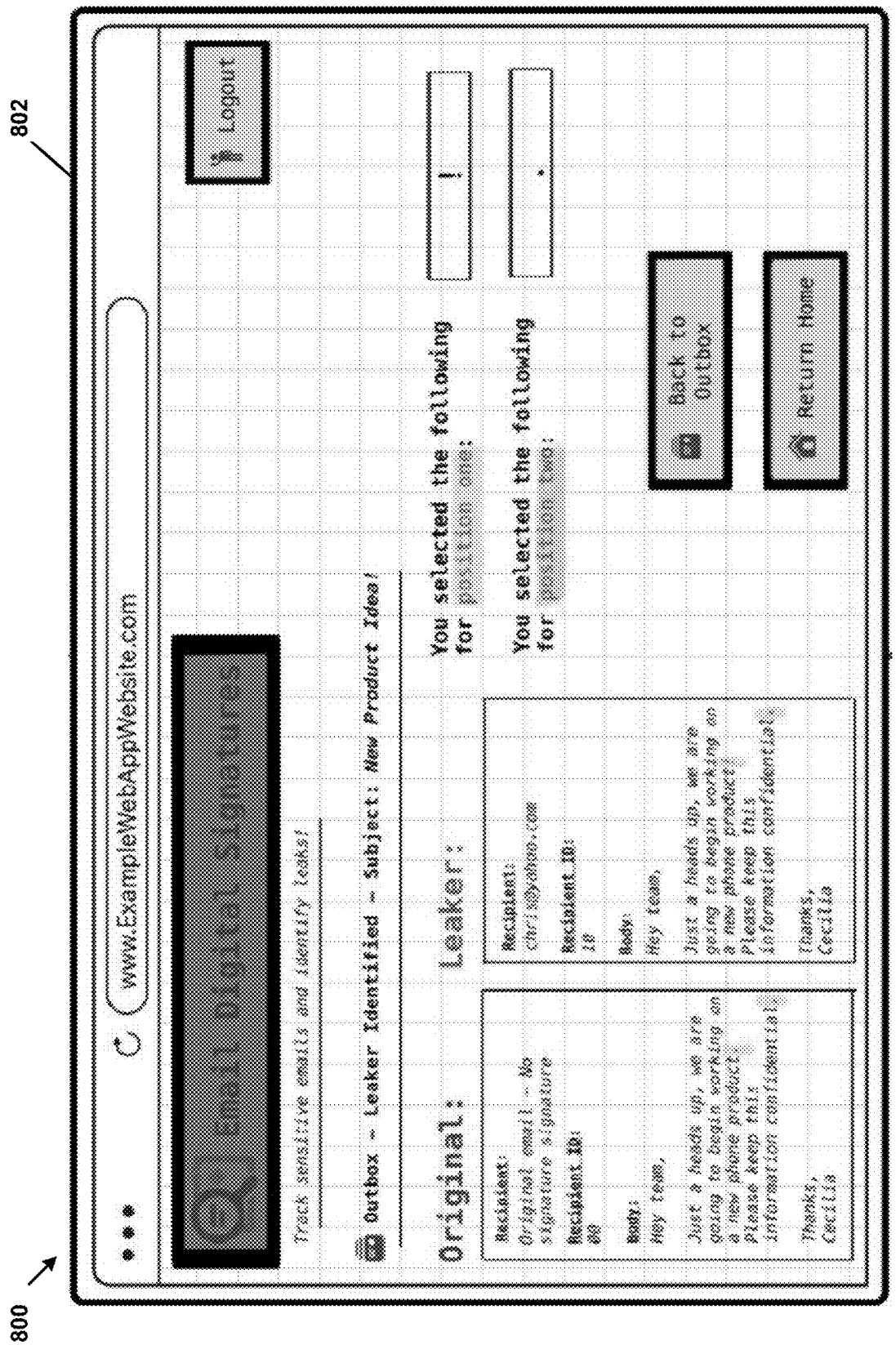

In FIG. 8D the user may enter the unique identifier that was in the obtained email. While this is illustrated as being performed manually, the identification engine 209a/404a may identify the signature positions in the obtained email and their respective signatures to obtain the unique identifier. In FIG. 8E, the identification engine 209b/404b may compare the unique identifier obtained to the stored unique identifiers that are mapped to the user identifier. Once a matched unique identifier is determined, the mapped user identifier is returned to the user.

Thus, systems and methods provide a document security system that allows a user to embed a unique hidden identifier into a document to track how the document is distributed or if another user caused a document to leak. For a document that a user produces, the system can determine signature positions in the document where a characteristic of the document is changeable without altering the main message or content of the document. The number of signature positions may be based on the number of ultimate user recipients that are to obtain the document and also the number of changes that a signature position can undergo. The system may create a plurality of copies of the document each having their own unique identifier created by the combination of the signature positions with their respective characteristic. Each copy's unique identifier may be mapped to a user identifier of the user obtaining the copy. The system can then provide those copies of the document to the intended recipients. If the original user or an administrator obtains one of the copies or a portion of the copies, that user or administrator may use the document security system to determine which recipient that copy came from using the unique identifier or layers of unique identifiers embedded in the copy. As such, the document security system provides an ability to track a document and determine document leaks.

Figure 9:
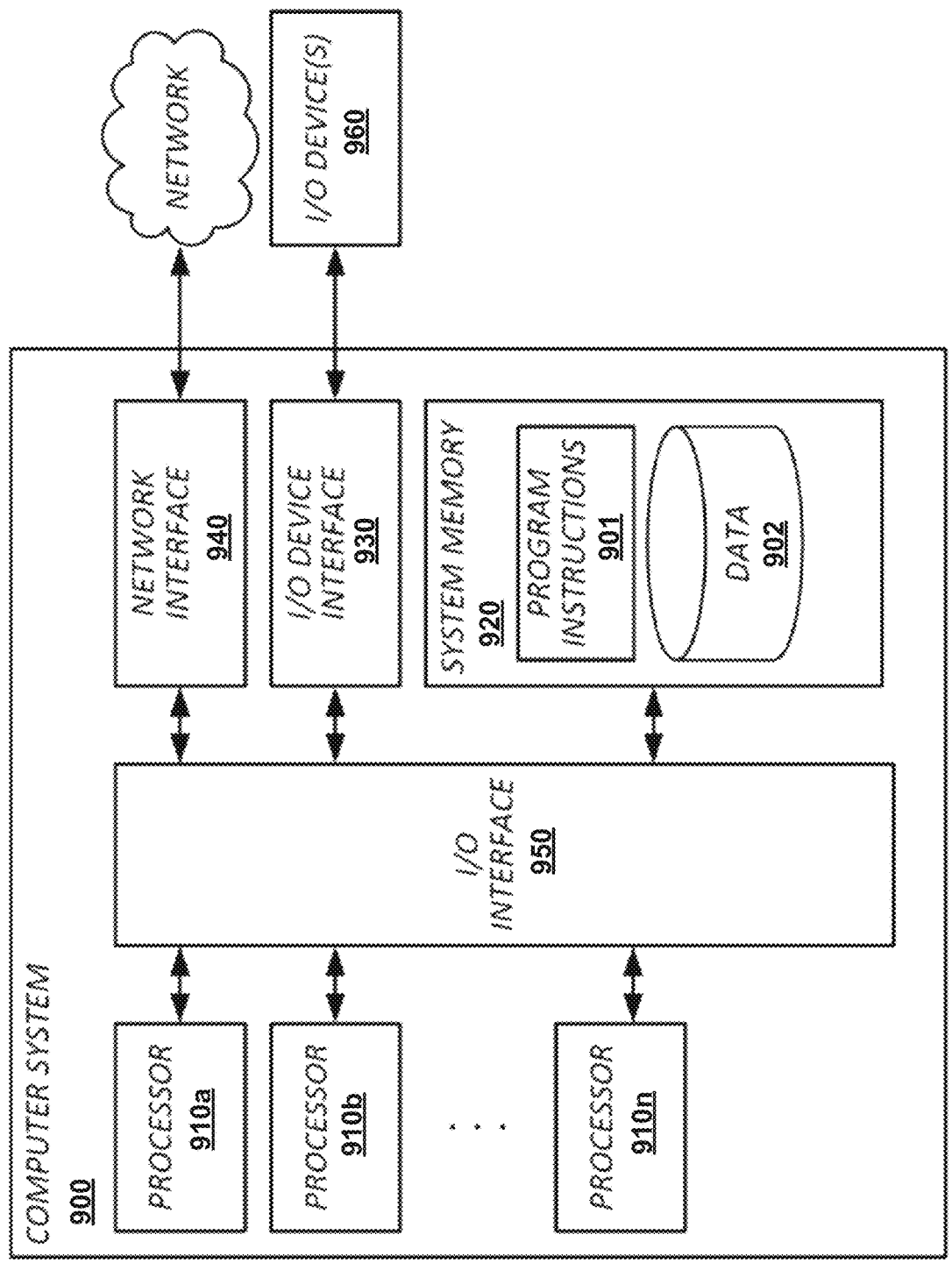
FIG. 9 shows an example of a computing device by which the present techniques may be implemented, in accordance with some embodiments of the present disclosure.

FIG. 9 is a diagram that illustrates an exemplary computing system 900 in accordance with embodiments of the present technique. Various portions of systems and methods described herein, may include or be executed on one or more computer systems similar to computing system 900. For example, the user devices 102/200, the service provider devices 106/300, or the document security devices 108/400 may include the computing system 900. Further, processes, operations, services, and modules described herein may be executed by one or more processing systems similar to that of computing system 900.

Computing system 900 may include one or more processors (e.g., processors 910a-910n) coupled to system memory 920, an input/output I/O device interface 930, and a network interface 940 via an input/output (I/O) interface 950. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 900. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 920). Computing system 900 may be a uni-processor system including one processor (e.g., processor 910a), or a multi-processor system including any number of suitable processors (e.g., 910a-910n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 900 may include a plurality of computing devices (e.g., distributed computer systems) to implement various processing functions.

I/O device interface 930 may provide an interface for connection of one or more I/O devices 960 to computer system 900. I/O devices may include devices that receive input (e.g., from a user) or output information (e.g., to a user). I/O devices 960 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 960 may be connected to computer system 900 through a wired or wireless connection. I/O devices 960 may be connected to computer system 900 from a remote location. I/O devices 960 located on remote computer system, for example, may be connected to computer system 900 via a network and network interface 940.

Network interface 940 may include a network adapter that provides for connection of computer system 900 to a network. Network interface 940 may facilitate data exchange between computer system 900 and other devices connected to the network. Network interface 940 may support wired or wireless communication. The network may include an electronic communication network, such as the Internet, a local area network (LAN), a wide area network (WAN), a cellular communications network, or the like.

System memory 920 may be configured to store program instructions 901 or data 902. Program instructions 901 may be executable by a processor (e.g., one or more of processors 910a-910n) to implement one or more embodiments of the present techniques. Instructions 901 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 920 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 920 may include a non-transitory computer readable storage medium that may have program instructions stored thereon that are executable by a computer processor (e.g., one or more of processors 910a-910n) to cause the subject matter and the functional operations described herein. A memory (e.g., system memory 920) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 950 may be configured to coordinate I/O traffic between processors 910a-910n, system memory 920, network interface 940, I/O devices 960, and/or other peripheral devices. I/O interface 950 may perform protocol, timing, or other data transformations to convert data signals from one component (e.g., system memory 920) into a format suitable for use by another component (e.g., processors 910a-910n). I/O interface 950 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 900 or multiple computer systems 900 configured to host different portions or instances of embodiments. Multiple computer systems 900 may provide for parallel or sequential processing/execution of one or more portions of the techniques described herein.

Those skilled in the art will appreciate that computer system 900 is merely illustrative and is not intended to limit the scope of the techniques described herein. Computer system 900 may include any combination of devices or software that may perform or otherwise provide for the performance of the techniques described herein. For example, computer system 900 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 900 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provide by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A tangible, non-transitory, machine-readable medium storing instructions that when executed by one or more processors effectuate operations comprising:
receiving, by one or more processors, instruction to provide an electronic text document to a plurality of users, wherein the instruction includes a security instruction;
determining, by one or more processors, one or more positions within the electronic text document where a change in a presentation of an at least one of an at least one character or an at least one image included in the electronic text document, wherein the determining the one or more positions includes:
parsing, by one or more processors, the electronic text document into a plurality of portions;
determining, by one or more processors, a reproduction likelihood score for each of the plurality of portions, wherein the reproduction likelihood score identifies a likelihood that a respective portion of the plurality of portions is to be reproduced;
selecting, by one or more processors, a first set of portions of the plurality of portions based on the reproduction likelihood score;
determining, by one or more processors, the at least one of the at least one character of text or the at least one image in the first set of portions that satisfies a change criterion; and
storing, by one or more processors, the one or more positions of the at least one of the at least one character of text or the at least one image in a storage system;
in response to the security instruction, generating, by one or more processors, a respective copy of the electronic text document for each user of the plurality of users, wherein each respective copy of the electronic text document is associated with a user identifier of a respective user of the plurality of users and each respective copy includes a respective unique identifier based on the change in presentation of the at least one of the at least one character of text or the at least one image at the one or more positions included in the electronic text document;
providing, by one or more processors, each respective copy of the electronic text document that includes the respective unique identifier to the respective user associated with the user identifier associated with that respective copy of the electronic text document; and
storing, by one or more processors, a mapping of each user identifier to the respective unique identifier for the respective copy of the electronic text document in the storage system.

2. The tangible, non-transitory, machine-readable medium of claim 1, wherein the operations further comprise:
receiving, by one or more processors, a first unique identifier obtained from an electronic text document;
comparing, by one or more processors, the first unique identifier to a plurality of mapped unique identifiers included in a plurality of mappings stored in the storage system;
determining, by one or more processors, that the first unique identifier matches a mapped unique identifier of the plurality of mapped unique identifiers included in the plurality of mappings stored in the storage system; and
providing, by one or more processors, the user identifier that is associated with the mapped unique identifier.

3. The tangible, non-transitory, machine-readable medium of claim 2, wherein the receiving the first unique identifier includes:
obtaining an image of a respective copy of one of the respective copies of the electronic text document for each user of the plurality of users;
extracting text from the image of the respective copy;
identifying the electronic text document from the extracted text;
obtaining a unique identifier position key associated with the electronic text document; and
obtaining, based on the unique identifier position key, the first unique identifier from the extracted text from the image of the respective copy.

4. The tangible, non-transitory, machine-readable medium of claim 1, wherein each position of the one or more positions is associated with a sub-identifier of the respective user.

5. The tangible, non-transitory, machine-readable medium of claim 1, wherein a number of positions selected is based on at least one of a number of users of the plurality of users or a number changes that the at least one of the at least one character of text or the at least one image can undergo.

6. The tangible, non-transitory, machine-readable medium of claim 1, wherein the respective unique identifier included in the stored mapping only includes position information of the one or more positions and the at least one of the at least one character of text or the at least one image included in the electronic text document that is changed and not the respective copy of the electronic text document to reduce processing and storage requirements.

7. The tangible, non-transitory, machine-readable medium of claim 1, wherein the respective unique identifier may include a plurality of sub-unique identifiers, wherein each sub-unique identifier independently identifies the respective copy of the electronic text document in which that sub-unique identifier is included, and wherein each sub-unique identifier is positioned away from another sub-unique identifier based on positioning instructions.

8. The tangible, non-transitory, machine-readable medium of claim 1, wherein the change in the presentation includes at least one of a change in background color of a text string or character, a change in a punctuation mark that maintains grammatical correctness, a change in a position of text strings in a list of text strings, a change in font color, a change in font style, a change in font size, a change in font, a change in spelling of a text string, a change in abbreviation, a change in spacing, or a steganography message within a plurality of pixels of the at least one image.

9. The tangible, non-transitory, machine-readable medium of claim 1, wherein each respective copy includes a second unique identifier, and wherein the operations further comprise:
receiving, by one or more processors, a portion of a first unique identifier and a portion of the second unique identifier obtained from a portion of an electronic text document;
comparing, by one or more processors, the portion of the first unique identifier and the portion of the second unique identifier to a plurality of mapped unique identifiers included in a plurality of mappings stored in the storage system;
determining, by one or more processors, that a combination of the portion of the first unique identifier and the portion of the second unique identifier matches a respective portion of a mapped unique identifier of the plurality of mapped unique identifiers included in the plurality of mappings stored in the storage system; and providing, by one or more processors, the user identifier that is associated with the mapped unique identifier.

10. A tangible, non-transitory, machine-readable medium storing instructions that when executed by one or more processors effectuate operations comprising:

receiving, by one or more processors, a first unique identifier obtained from a first copy of an electronic text document, wherein the first copy is one of a plurality of respective copies of the electronic text document generated for each user of a plurality of users that are to receive the electronic text document, wherein each respective copy of the electronic text document is associated with a user identifier of a respective user of the plurality of users and each respective copy includes a respective unique identifier based on a change in presentation of at least one of at least one character of text or at least one image included in the electronic text document, and wherein the first unique identifier is obtained from the first copy of the electronic text document by:

obtaining, by one or more processors, an image of the first copy, extracting, by one or more processors, text from the image of the first copy, identifying, by one or more processors, the electronic text document from the extracted text, obtaining, by one or more processors, a unique identifier position key associated with the electronic text document, and obtaining, by one or more processors and based on the unique identifier position key, the first unique identifier from the extracted text from the image of the first copy;

comparing, by one or more processors, the first unique identifier to a plurality of mapped unique identifiers included in mappings stored in a storage system;

determining, by one or more processors, that the first unique identifier matches a mapped unique identifier of the plurality of mapped unique identifiers included in the mappings stored in the storage system; and providing, by one or more processors, the user identifier that is associated with the mapped unique identifier.

11. The tangible, non-transitory, machine-readable medium of claim 10, wherein the operations further comprise:

receiving, by one or more processors, instruction to provide the electronic text document to the plurality of users, wherein the instruction includes a security instruction;

in response to the security instruction, generating, by one or more processors, a respective copy of the electronic text document for each user of the plurality of users;

providing, by one or more processors, each respective copy of the electronic text document that includes the respective unique identifier to the respective user associated with the user identifier associated with that respective copy of the electronic text document; and storing, by one or more processors, a mapping of each user identifier to the respective unique identifier for the respective copy of the electronic text document in the storage system.

12. The tangible, non-transitory, machine-readable medium of claim 11, wherein the operations further comprise:

determining, by one or more processors, one or more positions within the electronic text document where the change in the presentation of the at least one of the at least one character or the at least one image included in the electronic text document.

13. The tangible, non-transitory, machine-readable medium of claim 12, wherein the determining the one or more positions includes:

parsing, by one or more processors, the electronic text document into a plurality of portions;

determining, by one or more processors, a reproduction likelihood score for each of the plurality of portions, wherein the reproduction likelihood score identifies a likelihood that a respective portion of the plurality of portions is to be reproduced;

selecting, by one or more processors, a first set of portions of the plurality of portions based on the reproduction likelihood score;

determining, by one or more processors, the at least one of the at least one character of text or the at least one image in the first set of portions that satisfies a change criterion; and storing, by one or more processors, the one or more positions of the at least one of the at least one character of text or the at least one image in the storage system.

14. The tangible, non-transitory, machine-readable medium of claim 13, wherein each position of the one or more positions is associated with a sub-identifier of the respective user.

15. The tangible, non-transitory, machine-readable medium of claim 12, wherein a number of positions selected is based on at least one of a number of users of the plurality of users or a number changes that the at least one of the at least one character of text or the at least one image can undergo.

16. The tangible, non-transitory, machine-readable medium of claim 11, wherein the respective unique identifier included in the mapping only includes position information and the at least one of the at least one character of text or the at least one image included in the electronic text document that is changed and not the respective copy of the electronic text document to reduce processing and storage requirements.

17. The tangible, non-transitory, machine-readable medium of claim 11, wherein the respective unique identifier may include a plurality of sub-unique identifiers, wherein each sub-unique identifier independently identifies the respective copy of the electronic text document in which that sub-unique identifier is included, and wherein each sub-unique identifier is positioned away from another sub-unique identifier based on positioning instructions.

18. A method, comprising:

receiving, by one or more processors, instruction to provide an electronic text document to a plurality of users, wherein the instruction includes a security instruction;

determining, by one or more processors, one or more positions within the electronic text document where a change in a presentation of an at least one of an at least one character or an at least one image included in the electronic text document, wherein the determining the one or more positions includes:

parsing, by one or more processors, the electronic text document into a plurality of portions;

determining, by one or more processors, a reproduction likelihood score for each of the plurality of portions, wherein the reproduction likelihood score identifies a likelihood that a respective portion of the plurality of portions is to be reproduced;

selecting, by one or more processors, a first set of portions of the plurality of portions based on the reproduction likelihood score;

determining, by one or more processors, the at least one of the at least one character of text or the at least one image in the first set of portions that satisfies a change criterion; and storing, by one or more processors, the one or more positions of the at least one of the at least one character of text or the at least one image in a storage system;

in response to the security instruction, generating, by one or more processors, a respective copy of the electronic text document for each user of the plurality of users, wherein each respective copy of the electronic text document is associated with a user identifier of a respective user of the plurality of users and each respective copy includes a respective unique identifier based on the change in presentation of the at least one of the at least one character of text or the at least one image at the one or more positions included in the electronic text document;

providing, by one or more processors, each respective copy of the electronic text document that includes the respective unique identifier to the respective user associated with the user identifier associated with that respective copy of the electronic text document; and storing, by one or more processors, a mapping of each user identifier to the respective unique identifier for the respective copy of the electronic text document in the storage system.

19. A method comprising:

receiving, by one or more processors, a first unique identifier obtained from a first copy of an electronic text document, wherein the first copy is one of a plurality of respective copies of the electronic text document generated for each user of a plurality of users that are to receive the electronic text document, wherein each respective copy of the electronic text document is associated with a user identifier of a respective user of the plurality of users and each respective copy includes a respective unique identifier based on a change in presentation of at least one of at least one character of text or at least one image included in the electronic text document, and wherein the first unique identifier is obtained from the first copy of the electronic text document by:
  obtaining, by one or more processors, an image of the first copy,
  extracting, by one or more processors, text from the image of the first copy,
  identifying, by one or more processors, the electronic text document from the extracted text,
  obtaining, by one or more processors, a unique identifier position key associated with the electronic text document, and
  obtaining, by one or more processors and based on the unique identifier position key, the first unique identifier from the extracted text from the image of the first copy;

comparing, by one or more processors, the first unique identifier to a plurality of mapped unique identifiers included in mappings stored in a storage system;

determining, by one or more processors, that the first unique identifier matches a mapped unique identifier of the plurality of mapped unique identifiers included in the mappings stored in the storage system; and providing, by one or more processors, the user identifier that is associated with the mapped unique identifier.

* * * * *